(12) United States Patent
Jiao et al.

(10) Patent No.: US 11,768,911 B2
(45) Date of Patent: Sep. 26, 2023

(54) METHOD AND APPARATUS FOR EXECUTION OF NEURAL NETWORK

(71) Applicant: ALIBABA GROUP HOLDING LIMITED, Grand Cayman (KY)

(72) Inventors: Yang Jiao, San Jose, CA (US); Yijung Su, San Jose, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 282 days.

(21) Appl. No.: 17/003,354

(22) Filed: Aug. 26, 2020

(65) Prior Publication Data

US 2021/0089611 A1    Mar. 25, 2021

Related U.S. Application Data

(60) Provisional application No. 62/904,953, filed on Sep. 24, 2019.

(51) Int. Cl.
*G06F 9/46*      (2006.01)
*G06F 17/15*     (2006.01)
(Continued)

(52) U.S. Cl.
CPC ............ *G06F 17/153* (2013.01); *G06F 9/463* (2013.01); *G06F 9/4831* (2013.01); *G06F 9/4881* (2013.01); *G06N 3/04* (2013.01)

(58) Field of Classification Search
CPC ...... G06F 17/153; G06F 9/463; G06F 9/4831; G06F 9/4881; G06N 3/04
See application file for complete search history.

(56) References Cited

U.S. PATENT DOCUMENTS 10,592,250 B1 *   3/2020   Diamant ................ G06N 3/048
2017/0011288 A1    1/2017   Brothers et al.
(Continued)

OTHER PUBLICATIONS

International Search Report and Written Opinion of the International Searching Authority dated Nov. 13, 2020, in the corresponding PCT International Application No. PCT/US20/47938. (10 pages).

*Primary Examiner* — Tammy E Lee
(74) *Attorney, Agent, or Firm* — Finnegan, Henderson, Farabow, Garrett & Dunner, LLP

(57) ABSTRACT

The present disclosure relates to methods and apparatuses for execution of a neural network. An exemplary method can be implemented by a processing unit. The processing unit can include a command parser configured to dispatch commands and computing tasks and at least one core communicatively coupled with the command parser and configured to process the dispatched computing task. Each core can include a convolution unit, a pooling unit, at least one operation unit and a sequencer communicatively coupled with the convolution unit, the pooling unit, and the at least one operation unit and configured to distribute instructions of the dispatched computing task to the convolution unit, the pooling unit, and the at least one operation unit for execution. The method can include: reading, by the convolution unit, data from a local memory of the at least one operation unit; performing, by the convolution unit, a convolution operation on the data to generate a feature map; and performing, by the pooling unit, a pooling operation on the feature map.

20 Claims, 15 Drawing Sheets

(51) Int. Cl.
    *G06F 9/48*     (2006.01)
    *G06N 3/04*     (2023.01)

(56) References Cited

U.S. PATENT DOCUMENTS

| | | | |
|---|---|---|---|
| 2018/0157969 A1* | 6/2018 | Xie | G06F 7/57 |
| 2018/0253636 A1* | 9/2018 | Lee | G06N 3/02 |
| 2018/0293777 A1 | 10/2018 | Sarel et al. | |
| 2019/0138898 A1* | 5/2019 | Song | G06N 3/04 |
| 2019/0236449 A1* | 8/2019 | Imber | G06N 3/082 |
| 2019/0266784 A1 | 8/2019 | Singh et al. | |
| 2020/0372633 A1* | 11/2020 | Lee | G06T 3/4007 |
| 2020/0410337 A1* | 12/2020 | Huang | G06N 3/04 |

\* cited by examiner

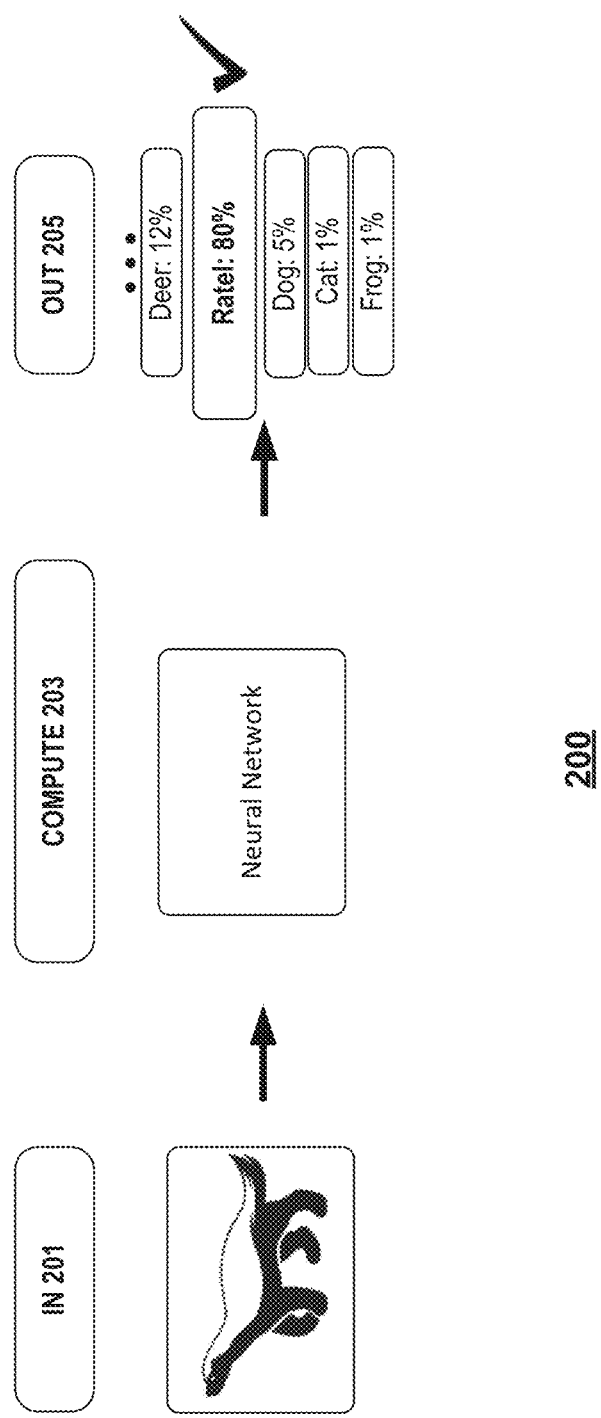

METHOD AND APPARATUS FOR EXECUTION OF NEURAL NETWORK

CROSS-REFERENCE TO RELATED APPLICATIONS

The present disclosure claims priority to U.S. provisional application No. 62/904,953, filed on Sep. 24, 2019, which is incorporated herein by reference in its entirety.

BACKGROUND

In machine learning (ML) or deep learning (DL), a neural network (NN) is a very powerful mechanism that basically mimics how a human brain learns. A deep neural network (DNN) is a category of neural networks. Over the years, DNN have demonstrated their great successes in various domains such as computer vision, natural language processing and the like. A typical DNN model can have millions of parameters, which requires significant computational and storage resources for model training and deployment. The development of contemporary massive parallel processing devices provides an opportunity of deploying DNN techniques in various applications.

A decade ago, general-purpose graphics processing unit (GPGPU) technology was developed to accelerate scientific computing. Nowadays, GPUs are widely employed for DNN techniques. Although being continually improved according to DNN computation requirements, resource usage efficiency of GPUs is suboptimal essentially due to many reasons. For example, GPU memory hierarchy has limit on-chip fast storage, while DNNs require quick access to massive data. In addition, GPUs maintain comprehensive general-purpose instruction set which requires additional resources, whereas for DNNs only handful dedicated programmable operations are necessary.

SUMMARY

In some embodiments, an exemplary method can be implemented by a processing unit. The processing unit can include a command parser configured dispatch commands and computing tasks and at least one core communicatively coupled with the command parser and configured to process the dispatched computing task. Each core can include a convolution unit, a pooling unit, at least one operation unit and a sequencer communicatively coupled with the convolution unit, the pooling unit, and the at least one operation unit and configured to distribute instructions of the dispatched computing task to the convolution unit, the pooling unit, and the at least one operation unit for execution. The method can include: reading, by the convolution unit, data from a local memory of the at least one operation unit; performing, by the convolution unit, a convolution operation on the data to generate a feature map; and performing, by the pooling unit, a pooling operation on the feature map.

In some embodiments, an exemplary non-transitory computer-readable storage medium stores a set of instructions that is executable by at least one processing unit to cause the computer to perform a method. The processing unit can include a command parser configured to dispatch commands and computing tasks and at least one core communicatively coupled with the command parser and configured to process the dispatched computing task. Each core can include a convolution unit, a pooling unit, at least one operation unit and a sequencer communicatively coupled with the convolution unit, the pooling unit, and the at least one operation unit and configured to distribute instructions of the dispatched computing task to the convolution unit, the pooling unit, and the at least one operation unit for execution. The method can include: reading, by the convolution unit, data from a local memory of the at least one operation unit; performing, by the convolution unit, a convolution operation on the data to generate a feature map; and performing, by the pooling unit, a pooling operation on the feature map.

In some embodiments, an exemplary processing unit can include a command parser configured to dispatch commands and computing tasks, and at least one core communicatively coupled with the command parser and configured to process the dispatched computing task. Each core can include: a convolution unit having circuitry configured, by a convolution instruction, to perform a convolution operation to generate a feature map; a pooling unit having circuitry configured, by a pooling instruction, to perform a pooling operation on the feature map; at least one operation unit having circuitry configured to process data; and a sequencer communicatively coupled with the convolution unit, the pooling unit, and the at least one operation unit, and having circuitry configured to distribute instructions of the dispatched computing task to the convolution unit, the pooling unit, and the at least one operation unit for execution.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIG. 2 is a schematic representation of an exemplary neural network inference pipeline workflow, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses, systems and methods consistent with aspects related to the invention as recited in the appended claims.

The apparatus and system disclosed herein can be used in various neural network-based architectures, such as convolutional neural networks (CNNs), recurrent neural networks (RNNs), or the like, and can be configured for architectures such as neural network processing units (NPUs) or the like.

Figure 1:
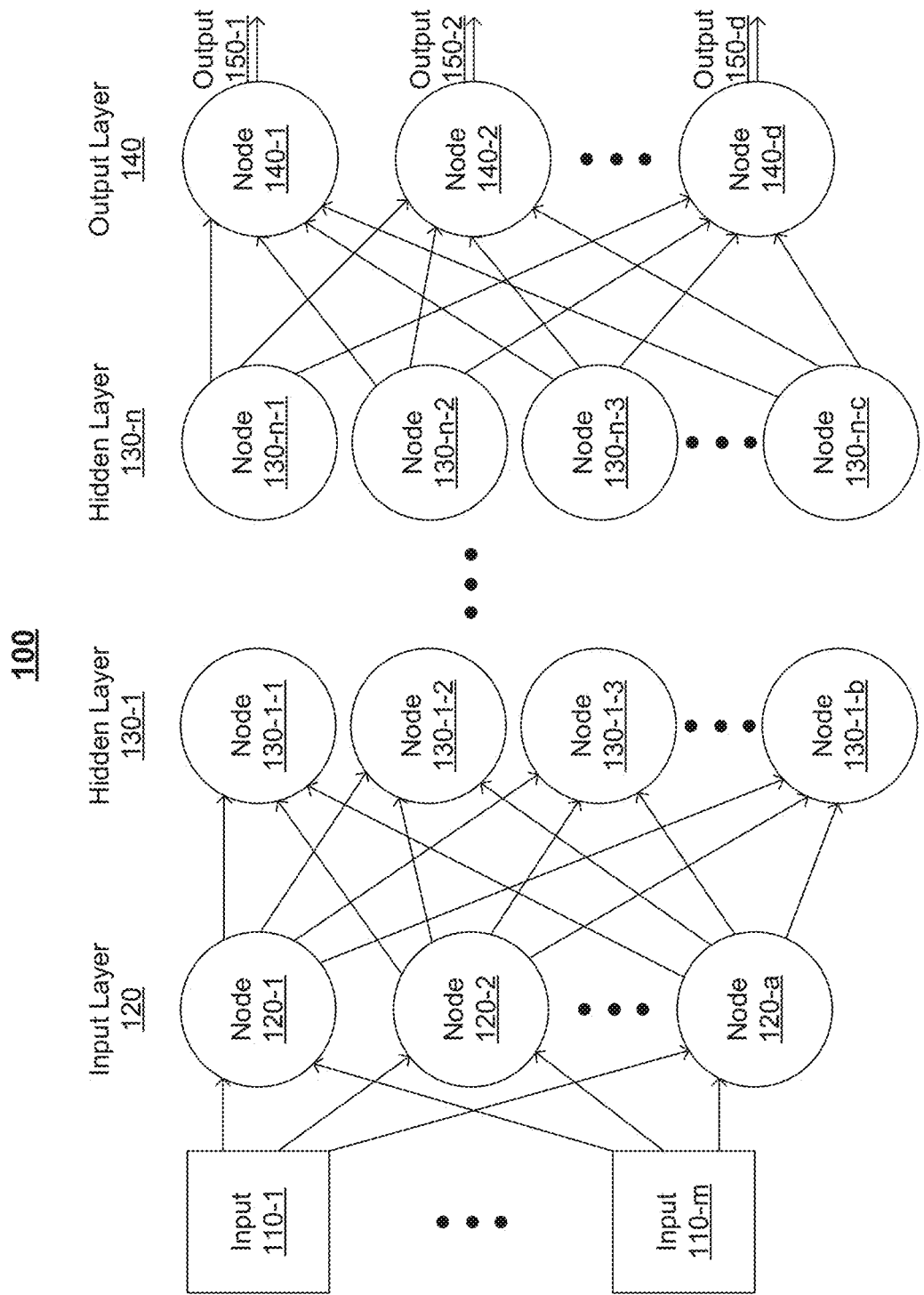
FIG. 1 is a schematic representation of a neural network, according to some embodiments of the present disclosure.

FIG. 1 illustrates an exemplary neural network (NN) 100. As depicted in FIG. 1, neural network 100 can include an input layer 120 that accepts inputs, e.g., input 110-1, . . . , input 110-$m$. Inputs can include an image, text, or any other structure or unstructured data for processing by neural network 100. In some embodiments, neural network 100 can accept a plurality of inputs simultaneously. For example, in FIG. 1, neural network 100 can accept up to m inputs simultaneously. Additionally or alternatively, input layer 120 can accept up to rn inputs in rapid succession, e.g., such that input 110-1 is accepted by input layer 120 in one cycle, a second input is accepted by input layer 120 in a second cycle in which input layer 120 pushes data from input 110-1 to a first hidden layer, and so on. Any number of inputs can be used in simultaneous input, rapid succession input, or the like.

Input layer 120 can comprise one or more nodes, e.g., node 120-1, node 120-2, . . . , node 120-$a$. Each node can apply an activation function to corresponding input (e.g., one or more of input 110-1, . . . , input 110-$m$) and weight the output from the activation function by a particular weight associated with the node. An activation function can comprise a Heaviside step function, a Gaussian function, a multiquadratic function, an inverse multiquadratic function, a sigmoidal function, a ReLU function, a Leaky ReLU function, a Tanh function, or the like. A weight can comprise a positive value between 0.0 and 1.0 or any other numerical value configured to allow some nodes in a layer to have corresponding output scaled more or less than output corresponding to other nodes in the layer.

As further depicted in FIG. 1, neural network 100 can include one or more hidden layers, e.g., hidden layer 130-1, . . . , hidden layer 130-$n$. Each hidden layer can comprise one or more nodes. For example, in FIG. 1, hidden layer 130-1 comprises node 130-1-1, node 130-1-2, node 130-1-3, . . . , node 130-1-$b$, and hidden layer 130-$n$ comprises node 130-$n$-1, node 130-$n$-2, node 130-$n$-3, . . . , node 130-$n$-$c$. Similar to nodes of input layer 120, nodes of the hidden layers can apply activation functions to output from connected nodes of the previous layer and weight the output from the activation functions by particular weights associated with the nodes.

As further depicted in FIG. 1, neural network 100 can include an output layer 140 that finalizes outputs, e.g., output 150-1, output 150-2, . . . , output 150-$d$. Output layer 140 can comprise one or more nodes, e.g., node 140-1, node 140-2, . . . node 140-$d$. Similar to nodes of input layer 120 and of the hidden layers, nodes of output layer 140 can apply activation functions to output from connected nodes of the previous layer and weight the output from the activation functions by particular weights associated with the nodes.

Although depicted as fully connected in FIG. 1, the layers of neural network 100 can use any connection scheme. For example, one or more layers (e.g., input layer 120, hidden layer 130-1, . . . , hidden layer 130-$n$, output layer 140, or the like) can be connected using a convolutional scheme, a sparsely connected scheme, or the like. Such embodiments can use fewer connections between one layer and a previous layer than depicted in FIG. 1.

Moreover, although depicted as a feedforward network in FIG. 1, neural network 100 can additionally or alternatively use backpropagation (e.g., by using long short-term memory nodes or the like). Accordingly, although neural network 100 is depicted similar to a convolutional neural network (CNN), neural network 100 can comprise a recurrent neural network (RNN) or any other neural network.

In general, a neural network has two stages in deep learning workflow: training and inference. During training, the neural network keeps learning parameter values by iteratively updating them to minimize prediction error. When converged, the neural network with learned parameters can then be used to perform inference tasks on new cases.

FIG. 2 illustrates an exemplary neural network inference pipeline workflow 200, according to some embodiments of the present disclosure. Although inference workflow 200 relates to image recognition, it is appreciated that this is only an example rather than a limitation. As shown in FIG. 2, a trained neural network (e.g., neural network 100 of FIG. 1) can receive an input 201, e.g., an image of a ratel, and perform computation 203 on input 201. Specifically, a forward propagation (FP) starts in the neural network and data flow from an input layer, through one or more hidden layers, to an output layer. As explained with reference to FIG. 1, each layer in the neural network receives inputs from precedent layer (or layers), performs computation on the inputs, and sends output to subsequent layer (or layers). After computation, the neural network provides an output 205, e.g., an evaluation result. As depicted in FIG. 2, the output 205 can include a plurality of possible evaluation items with respective probabilities. The item with highest probability can be determined as final evaluation result.

Convolutional Neural Network (CNN) is a DNN category. CNN is widely used in many technical fields. For example, CNN can perform visual tasks, e.g., image features/patterns learning or recognition.

Figure 3A:
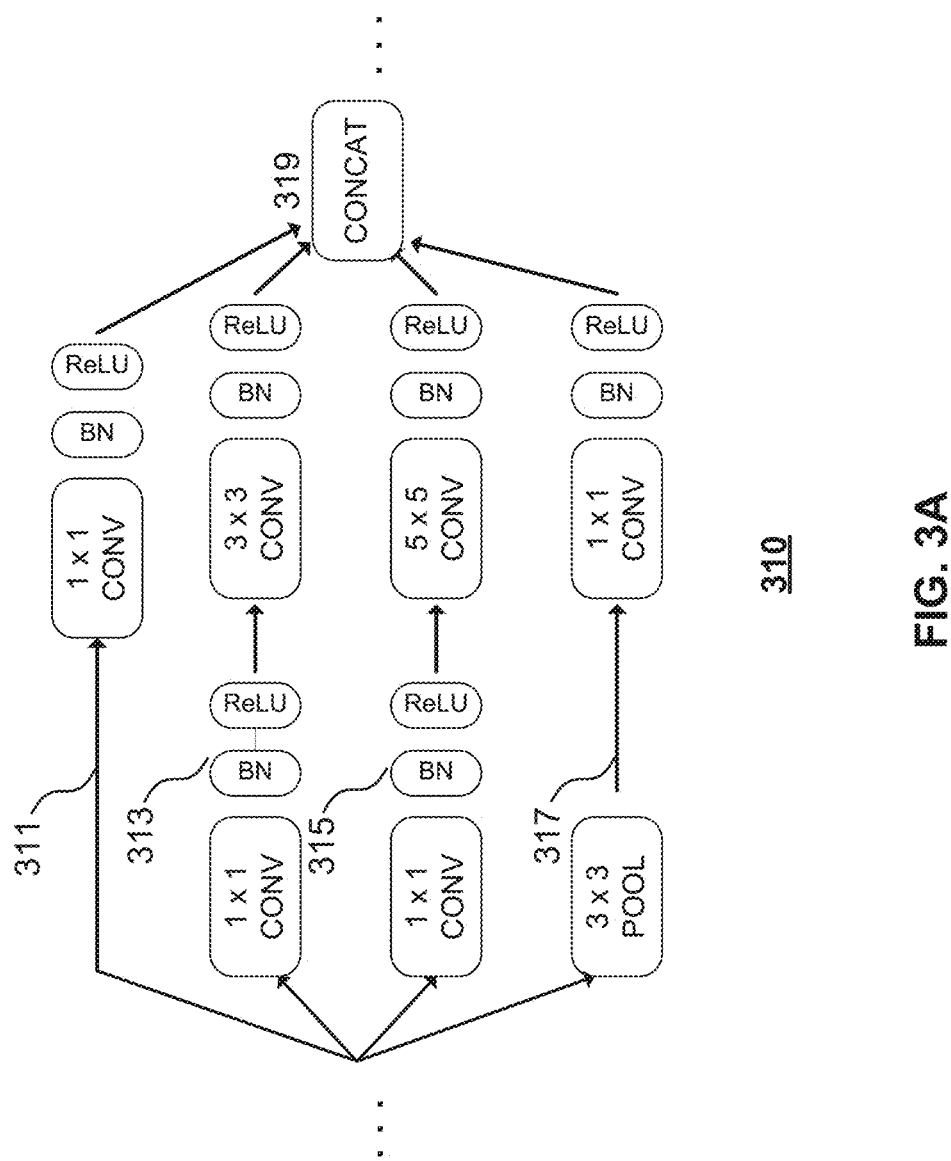
FIG. 3A is a schematic representation of a fragment of building blocks in an exemplary convolutional neural network (CNN), according to some embodiments of the present disclosure.

FIG. 3A illustrates a fragment 310 of building blocks in an exemplary CNN. For example, the exemplary fragment 310 can be an inception module. As depicted in FIG. 3A, fragment 310 can include a plurality branches in parallel, e.g., convolution branches 311, 313, 315, and pooling branch 317. Convolution branch 311 can include a 1×1 convolution (CONV) block. Convolution branch 313 can include a 3×3 convolution block and a 1×1 convolution block located before it. Convolution branch 315 can include a 5×5 convolution block and a 1×1 convolution block located before it. Pooling branch 317 can include a 3×3 pooling (POOL) block and a 1×1 convolution block located after it. For example, pooling block can be a 3×3 max pooling block. Along with each convolution block, there can be a batch normalization (BN) block and an activation block. For example, the activation block can be ReLU block, Leaky ReLU block, Sigmoid block, Tanh block, and the like.

As shown in FIG. 3A, fragment 310 can also include a concatenation (CONCAT) block 319. Concatenation block 319 can be connected to a plurality of branches, e.g., branches 311, 313, 315 and 317. Branches can receive input from previous layer (layers) and perform computations. Concatenation block 319 can concatenate results from convolution branches 311, 313, 315 and pooling branch 317, and provide a result to other blocks or layers. The CNN can include a plurality of fragments 310, an input layer, an output layer and one or more other layers.

Figure 3B:
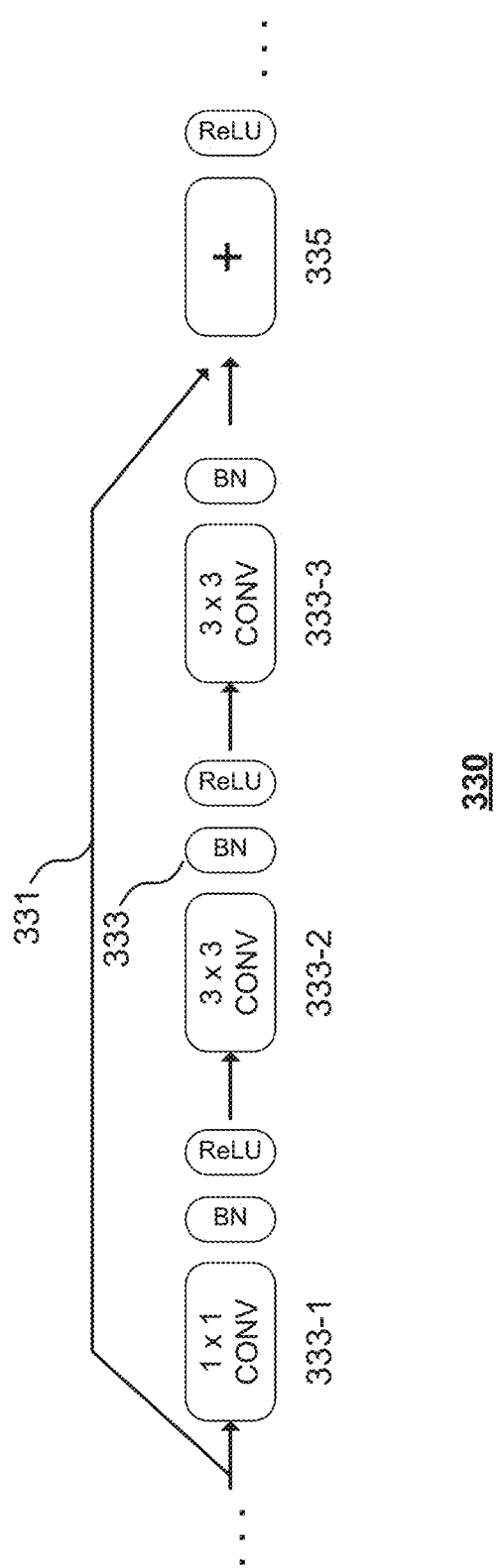
FIG. 3B is a schematic representation of a fragment of building blocks in another exemplary CNN, according to some embodiments of the present disclosure.

FIG. 3B illustrates a fragment 330 of building blocks in another exemplary CNN. For example, the exemplary CNN can be a residual network. As shown in FIG. 3B, fragment 330 can include a plurality of branches, e.g., branch 331 and convolution branch 333. Convolution branch 333 can include a 1×1 convolution (CONY) block 333-1, a 3×3 convolution block 333-2, and a 3×3 convolution block 333-3. Convolution branch 333 receives input from previous layer (layers) and perform computations on the input. Branch 331 includes a skip connection across convolution branch 333. Fragment 330 can also include an addition block that receives inputs from branches 331 and 333 and perform addition. In addition, fragment 330 can also include one or more BN blocks and activation blocks (e.g., ReLU block). The CNN can include a plurality of fragments 330, an input layer, an output layer and one or more other layers.

Figure 4:
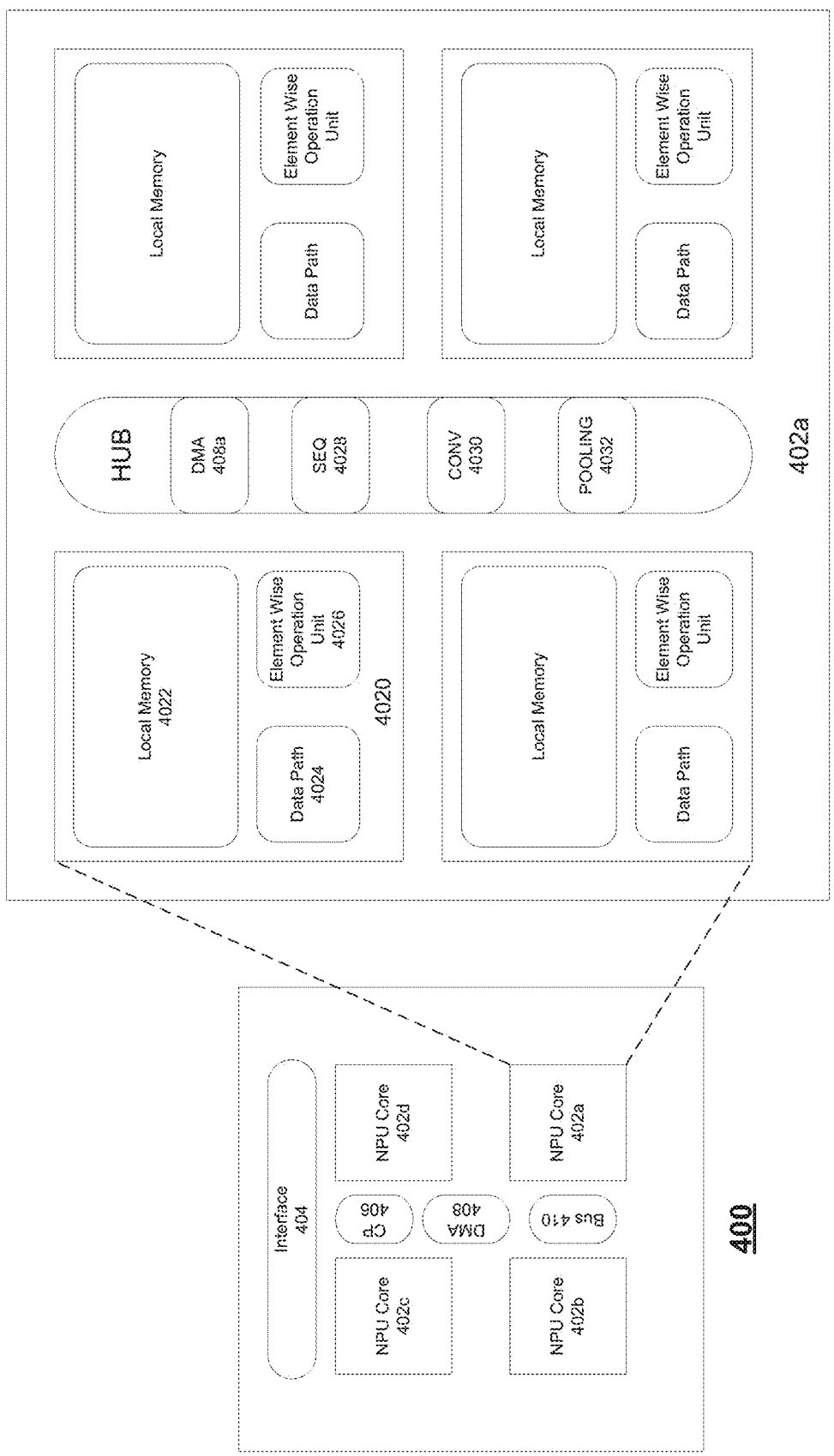
FIG. 4 is a schematic representation of an exemplary neural network processing unit (NPU), according to embodiments of the present disclosure.

FIG. 4 illustrates an exemplary neural processing unit (NPU) 400, according to some embodiments of the present disclosure. As shown in FIG. 4, NPU 400 can include at least one core 402 (e.g., 402a, 402b, 402c, and 402d), an interface 404, a command parser (CP) 406, a direct memory access (DMA) unit 408, and the like. It is appreciated that NPU 400 can also include a bus 410, a global memory (not shown), and the like.

Interface 404 can provide communication between NPU 400 and outside devices. For example, interface 404 can include a peripheral component interconnect express (PCI-E) interface, which provide connection with a host unit (not shown in FIG. 4). Interface 404 can also include at least one of a universal serial bus (USB), a joint test action group (JTAG) interface, a TUN/TAP interface, and the like.

CP 406 can interact with the host unit under the supervision of kernel mode driver (KMD) and pass neural network task, the pertinent commands or instruction and data to each NPU core 402. CP 406 can include circuitry configured to perform the interaction with the host unit and passing neural network task, the pertinent commands or instruction and data to each NPU core 402. In some embodiments. CP 406 can receive a DMA command from the host unit, and load instructions for a neural network (e.g., a sequence of instructions for the neural network generated by a compiler in the host unit), weights or scale/bias constant of the neural network to an NPU core 402 according to the DMA command. For example, CP 406 can load instructions for neural network from an external memory to an instruction buffer of the NPU core 402, weights to a local memory 4022 of the NPU core 402, or scale/bias constant to a constant buffer of the NPU core 402, according to the DMA command. In some embodiments, CP 406 can work with a host unit or KMD to distribute neural network tasks (e.g., recognition of an image, including data for the image) to NPU core 402. For example, the host unit or KMD can send a neural network task to a queue for an NPU core 402 to which the neural network task is assigned, and CP 406 can distribute the neural network task to the NPU core 402. In some embodiments, when neural network task is finished on NPU core 402 (e.g., NPU core 402 can send a "compute done" message to CP 406), CP 406 can notify the host unit or KMD. A new neural network task can be assigned to the NPU core 402 by the host unit or KMD.

DMA unit 408 can assist with transferring data between components of NPU 400. DMA unit 408 can include circuitry configured to perform transfer of data or commands. For example, DMA unit 408 can assist with transferring data between multiple NPU cores (e.g., cores 402a-402d) or within each NPU core. DMA unit 408 can also allow off-chip devices to access both on-chip and off-chip memory via interface 404 without causing an interrupt. For example, DMA unit 408 can load data or instructions into local memory of NPU cores. Thus, DMA unit 408 can also generate memory addresses and initiate memory read or write cycles. DMA unit 408 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that each NPU core (e.g., core 402a) can include a sub DMA unit, which can be used to transfer data within the NPU core.

DMA unit 408 can also move block data among NPU cores via bus 410. While a single NPU core is capable of handling a typical inference task (e.g., ResNet50 v1), NPU cores can also work together via the bus to take on large and complex tasks (e.g., RestNet101, Mask R-CNN, and the like).

Bus 410 can provide high speed cross NPU cores communication. Bus 410 also connects the NPU cores with other units, such as the off-chip memory or peripherals.

Core 402 (e.g., core 402a) can include one or more processing units configured to perform one or more operations (e.g., multiplication, addition, multiply-accumulate, element-wise operation, etc.) based on commands received from, e.g., CP 406. For example, core 402 can receive a neural network task, instructions and data (e.g., weights or scale/bias constant of a neural network) from CP 406, and execute the instructions using the data. In some embodiments, when NPU core 402 finishes neural network task, it can notify CP 406. For example, NPU core 402 can send a "compute done" message to CP 406. As shown in FIG. 4, core 402a can include at least one operation unit 4020, a sequencer 4028, a convolution unit 4030, a pooling unit 4032, and a DMA unit 408a, which can be connected via a data fabric and arbitration sub-system (also referred to as a HUB unit). In some embodiments, the HUB unit can include circuitry configured to provide convolution data and pooling data associated with the neural network task to convolution unit 4030 and pooling unit 4032, respectively.

Operation unit 4020 can include circuitry configured to perform operations on received data (e.g., matrices). In some embodiments, each operation unit 4020 can further include a local memory 4022, a matrix multiplication data path (DP) 4024, and an in-lined element-wise operation (EWOP) unit 4026. Local memory 4022 can provide storage space with fast read/write speed. To reduce possible interaction with a global memory, storage space of local memory 4022 can be 180 megabytes (MB) and above. With the massive storage space, most of data access can be performed within core 402, reducing the latency caused by data access. DP 4024 can include circuitry configured to perform matrix multiplication (e.g., dot production), and EWOP unit 4026 can include circuitry configured perform element-wise operation on received data (e.g., vector-vector multiplication). It is appreciated that, though FIG. 4 shows four operation units 4020, core 402a can include more or less operation units 4020.

Sequencer 4028 can be coupled with the instruction buffer and include circuitry configured to retrieve commands or instructions and distribute the commands to components of e.g., core 402. For example, sequencer 4028 can include circuitry configured to distribute convolution commands to convolution unit 4032 to perform convolution operations, or distribute pooling commands to pooling unit 4033 to perform pooling operations. In some embodiments, sequencer 4028 can include circuitry configured to modify the pertinent instructions stored in the instruction buffer of each NPU core 402, so that NPU cores 402 can work in parallel as much as possible. Sequencer 4028 can also include circuitry configured to monitor execution of a neural network task, and parallelize sub-tasks of the neural network task to improve efficiency of the execution.

Convolution unit 4030 can be coupled with sequencer 4028 and one or more operation units 4020, and include circuitry configured to instruct the one or more operation units 4020 to perform convolution operations. In some embodiments, convolution unit 4030 can send commands to local memory 4022 to send activation data and weight data to data path 4024 for performing convolution operations.

Pooling unit 4032 can further include an interpolation unit, a pooling data path, and the like, and include circuitry configured to perform pooling operations. For example, the interpolation unit can include circuitry configured to interpolate pooling data. The pooling data path can include circuitry configured to perform a pooling operation on the interpolated pooling data.

DMA unit 408a can be part of DMA unit 408 or an independent unit of each core. DMA unit 408a include circuitry configured to transfer data or commands. Commands can also be distributed to DMA unit 408a to instruct DMA unit 408a to load instructions/commands from a local memory (e.g., local memory 4022 of FIG. 4) into corresponding units. The loaded instructions/commands may then be distributed to each processing unit assigned with the corresponding task, and the one or more processing units may process these instructions/commands.

Figure 5A:
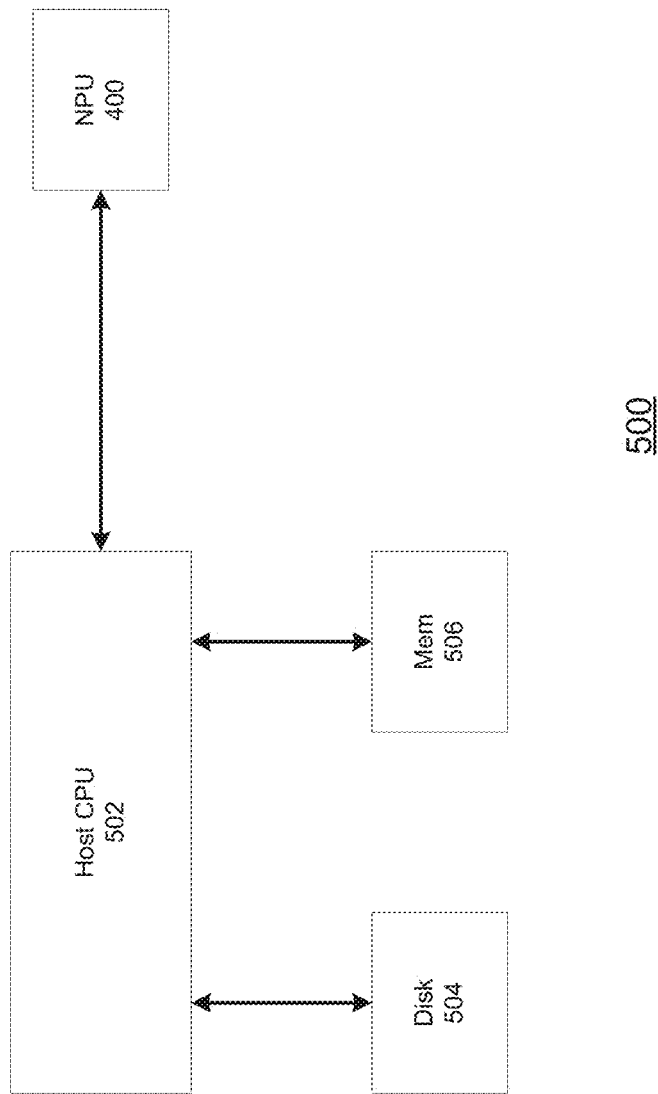
FIG. 5A is a schematic representation of an exemplary machine learning system, according to some embodiments of the present disclosure.

FIG. 5A illustrates an exemplary machine learning system 500, according to some embodiments of the present disclosure. As shown in FIG. 5A, machine learning system 500 may include a host CPU 502, a disk 504, a host memory 506, and a neural network processing unit (NPU) 400. In some embodiments, host memory 506 may be an integral memory or an external memory associated with host CPU 502. Host memory 506 may be a local or a global memory. In some embodiments, disk 504 may comprise an external memory configured to provide additional memory for host CPU 502.

Host CPU 502 (e.g., an X86 or ARM central processing unit) can be coupled with host memory 506 and disk 504, configured to process general instructions. NPU 400 may be connected to host CPU 502 through a peripheral interface (e.g., interface 404). As referred to herein, a neural network processing unit (e.g., NPU 400) may be a computing device for accelerating neural network inference tasks. In some embodiments, NPU 400 may be configured to be used as a co-processor of host CPU 502.

In some embodiments, a compiler may be on a host unit (e.g., host CPU 502 or host memory 506 of FIG. 5A) or NPU 400, configured to push one or more commands to NPU 112. The compiler is a program or computer software that transforms computer codes written in one programming language into instructions for NPU 400 to create an executable program. in machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, when machine learning system 500, the compiler can compile a neural network to generate static parameters, e.g., connections among neurons and weights of the neurons.

As discussed above, these commands can be further processed by CP 406 of NPU 400, temporarily stored in an instruction buffer of NPU 400, and distributed to processing units of NPU 400 accordingly.

It is appreciated that the first few instructions received by the NPU cores may instruct the NPU cores to load/store data from host memory 506 into one or more local memories of the NPU cores (e.g., local memory 4022 of FIG. 4). Each NPU core may then initiate the instruction pipeline, which involves fetching the instruction (e.g., via a sequencer) from the instruction buffer, decoding the instruction (e.g., via a DMA unit) and generating local memory addresses (e.g., corresponding to an operand), reading the source data, executing or loading/storing operations, and then writing back results.

Figure 5B:
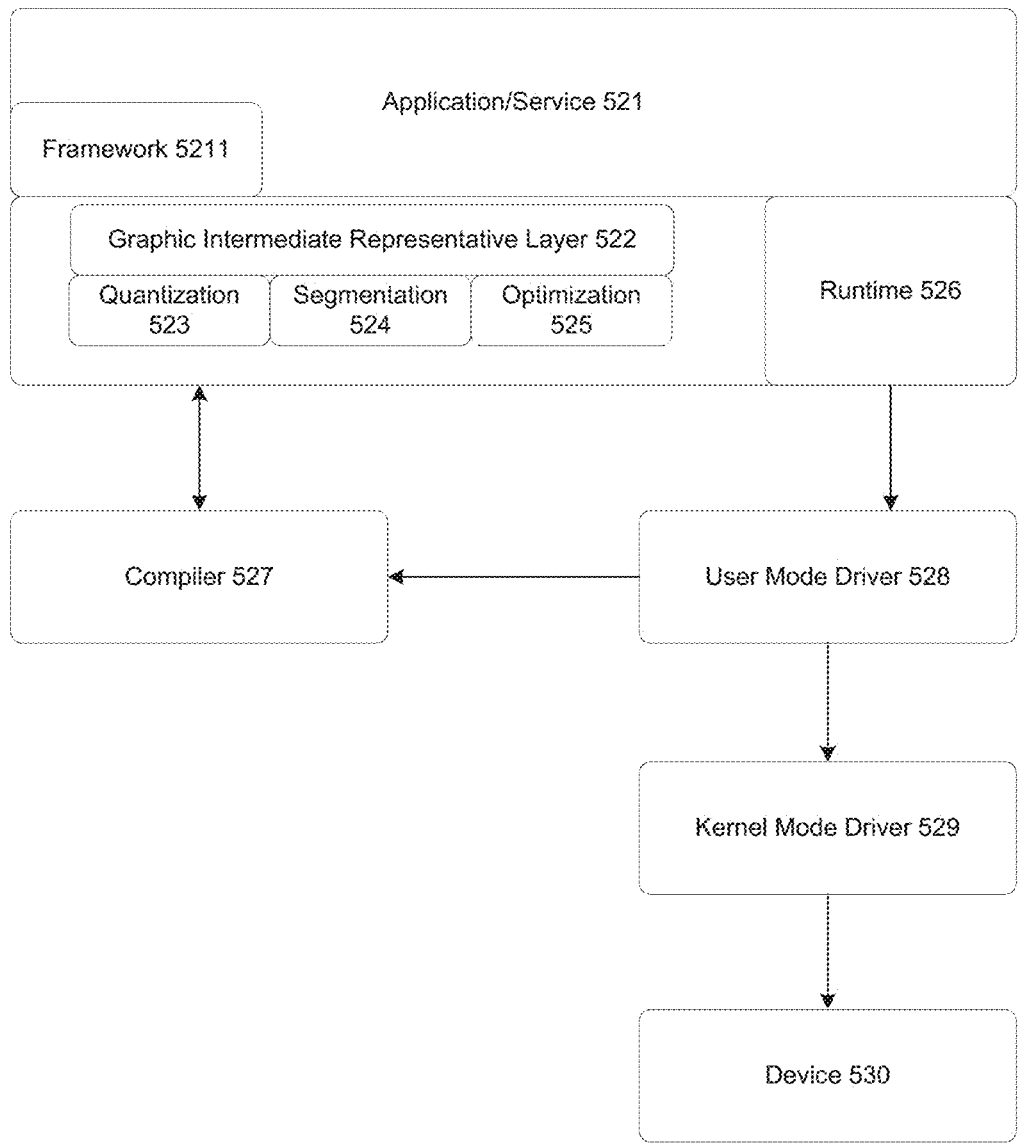
FIG. 5B illustrates a schematic diagram of a multi-layer software architecture, according to some embodiments of the present disclosure.

Building around NPU 400, a multi-layer software architecture can be employed to provide a flexible and easy-to-extend environment. FIG. 5B illustrates a schematic diagram of a multi-layer software architecture 520, according to some embodiments of the disclosure.

To deploy a neural network model, distinctive neural network topologies constructed from different neural network frameworks 5211 (e.g. TensorFlow, MxNet, and the like) can be converted into a graphic intermediate representative form (graphic IR). The deployment frontend and compiler 527 can start with the graphic IR, apply a series of exploitation and refinement in taints of model quantization 523, segmentation 524, and optimization 525, then generate the executables that meet the accuracy requirement while having the best performance. To dispatch tasks, a runtime (RT) layer 526 can act as a sole access point for job to be dispatched to NPU 400. The RT layer 526 can work with a user mode driver (UMD) 528 to set up for task deploying, and issue that to NPU 400 via the kernel mode drive (KMD) 529. The RT layer 526 can also feed the just in time binding and completing information to the drivers, providing the needed device and context management on NPU 400. As NPU 400 can provide full visibility on context resources and use a direct scheme to interact with host on the task-to-task level, robust and consistent results can be provided.

Figure 5C:
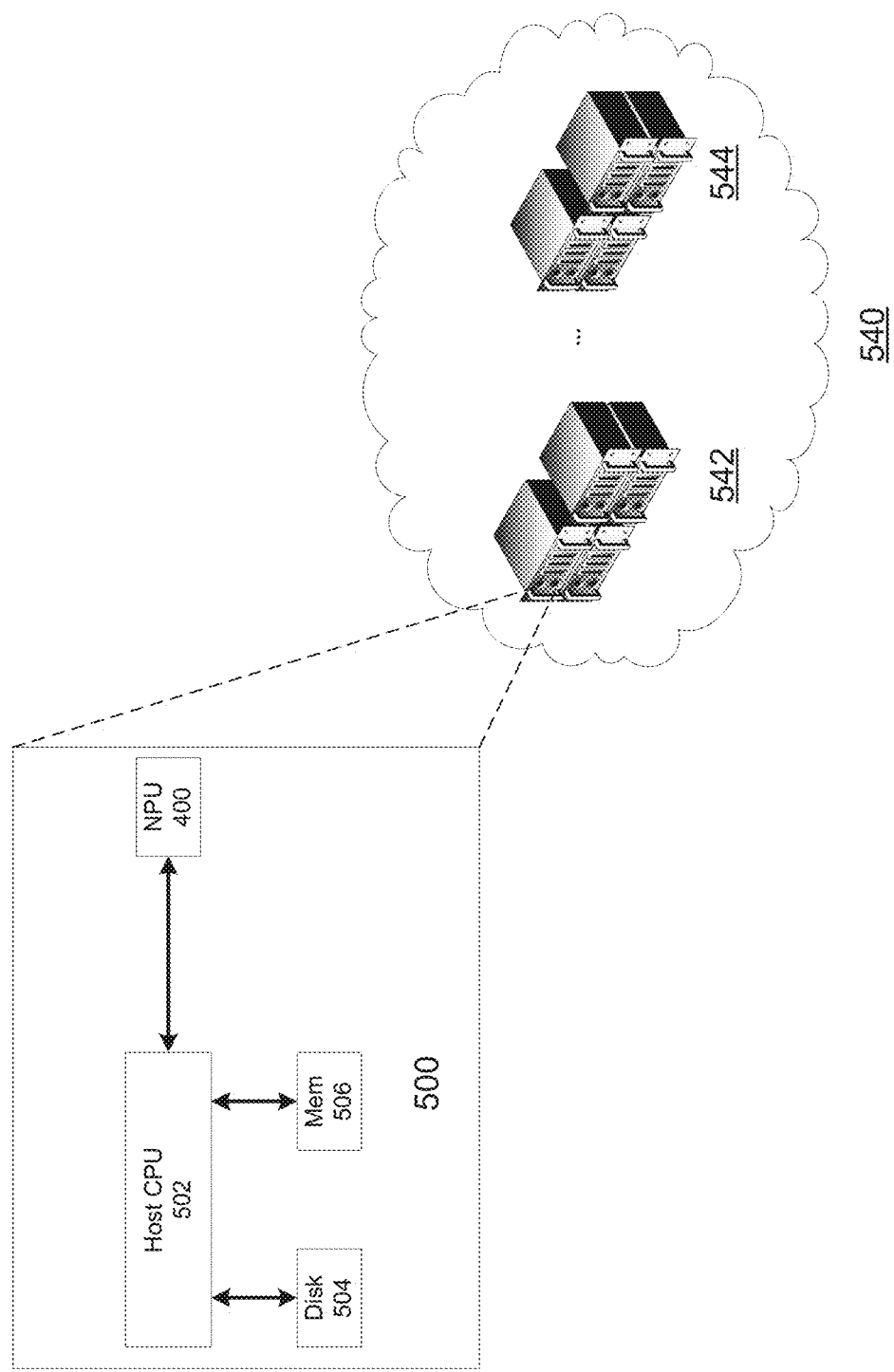
FIG. 5C illustrates a schematic diagram of an exemplary cloud system incorporating an NPU, according to some embodiments of the present disclosure.

Reference is now made to FIG. 5C. FIG. 5C illustrates a schematic diagram of an exemplary cloud system 540 incorporating NPU 400, according to some embodiments of the disclosure.

With the assistance of NPU 400, cloud system 540 can provide the extended AI capabilities of image recognition, facial recognition, translations, 3D modeling, and the like.

Figure 6A:
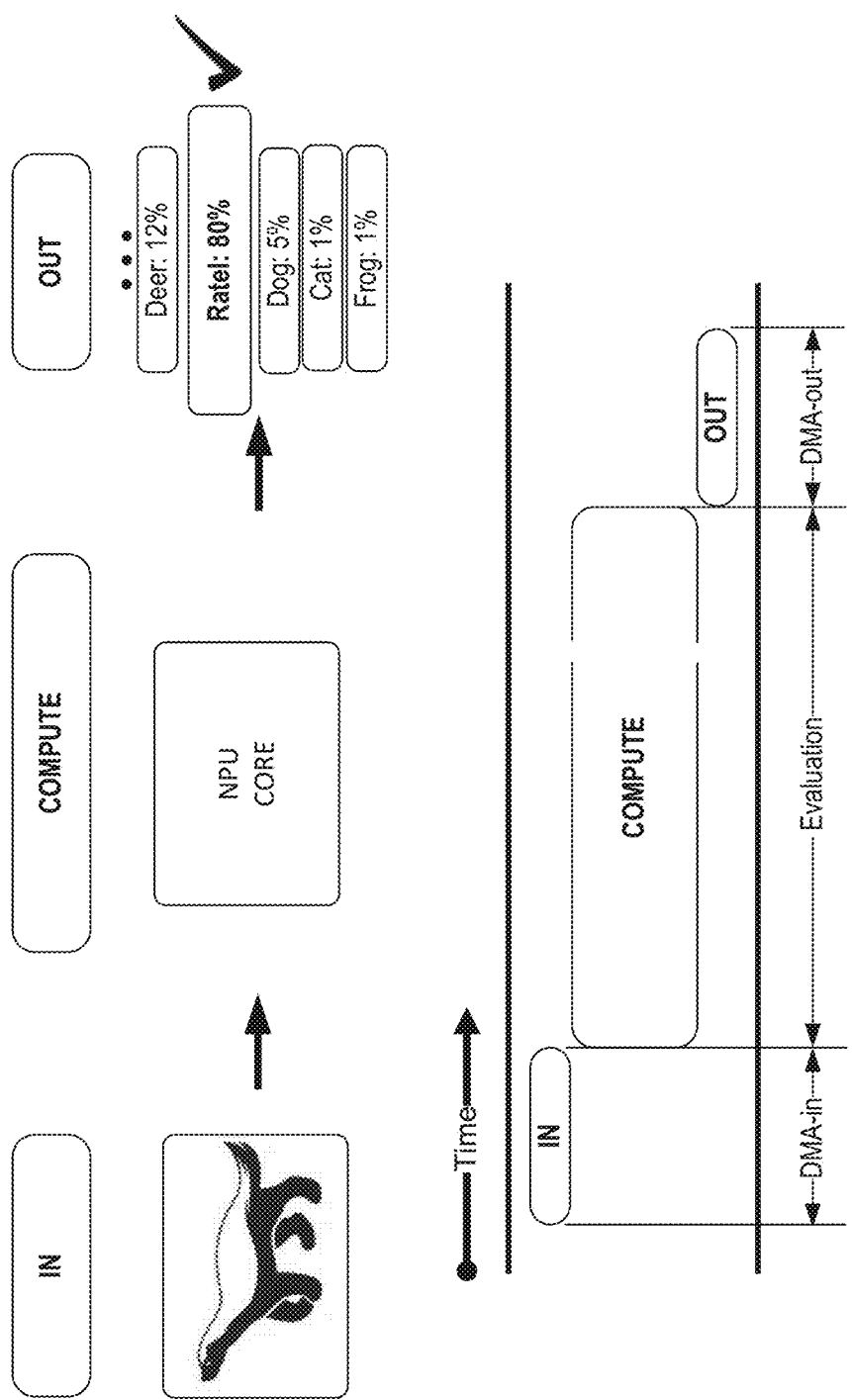
FIG. 6A is a schematic representation of an exemplary inference workflow of an NPU core, according to some embodiments of the present disclosure.

It is appreciated that, NPU 400 can be deployed to computing devices in other forms. For example, NPU 400 can also be integrated in a computing device, such as a smart phone, a tablet, and a wearable device FIG. 6A illustrates an exemplary inference workflow 610 of an NPU core, according to some embodiments of the present disclosure. For example, the NPU core can be any one of NPU cores 402a-d of FIG. 4. Although inference workflow 610 relates to image recognition, it is appreciated that this is only an example rather than a limitation. As shown in FIG. 6A, the NPU core can receive an input, e.g., an image of a ratel. For example, a DMA unit (not shown) of the NPU core (e.g., DMA unit 408a of NPU core 402a as shown in FIG. 4) can communicate with outside components, such as accessing on-chip or off-chip memory, to receive input data. DMA unit can load the input date into local memory (not shown) of the NPU core (e.g., local memory 4022 of NPU core 402a as shown in FIG. 4). The NPU core can execute a neural network to perform computation on input data. For example, the computation can be performed by cooperation of local memory 4022, sequencer 4028, operation unit 4020, convolution unit 4030, pooling unit 4032 and DMA unit 408a, in NPU core 402a of FIG. 4. With the cooperation, the computation can be performed without interruption. NPU core can produce an output, e.g., an evaluation result. As depicted in FIG. 6A, the output can include a plurality of possible evaluation items with respective probabilities. The item with highest probability (e.g., ratel with a probability of 80%) can be determined as the final evaluation result. For example, DMA unit can send the output (e.g., evaluation result) to outside, such as another core, a host unit, on-chip or off-chip memory, or the like.

Figure 6B:
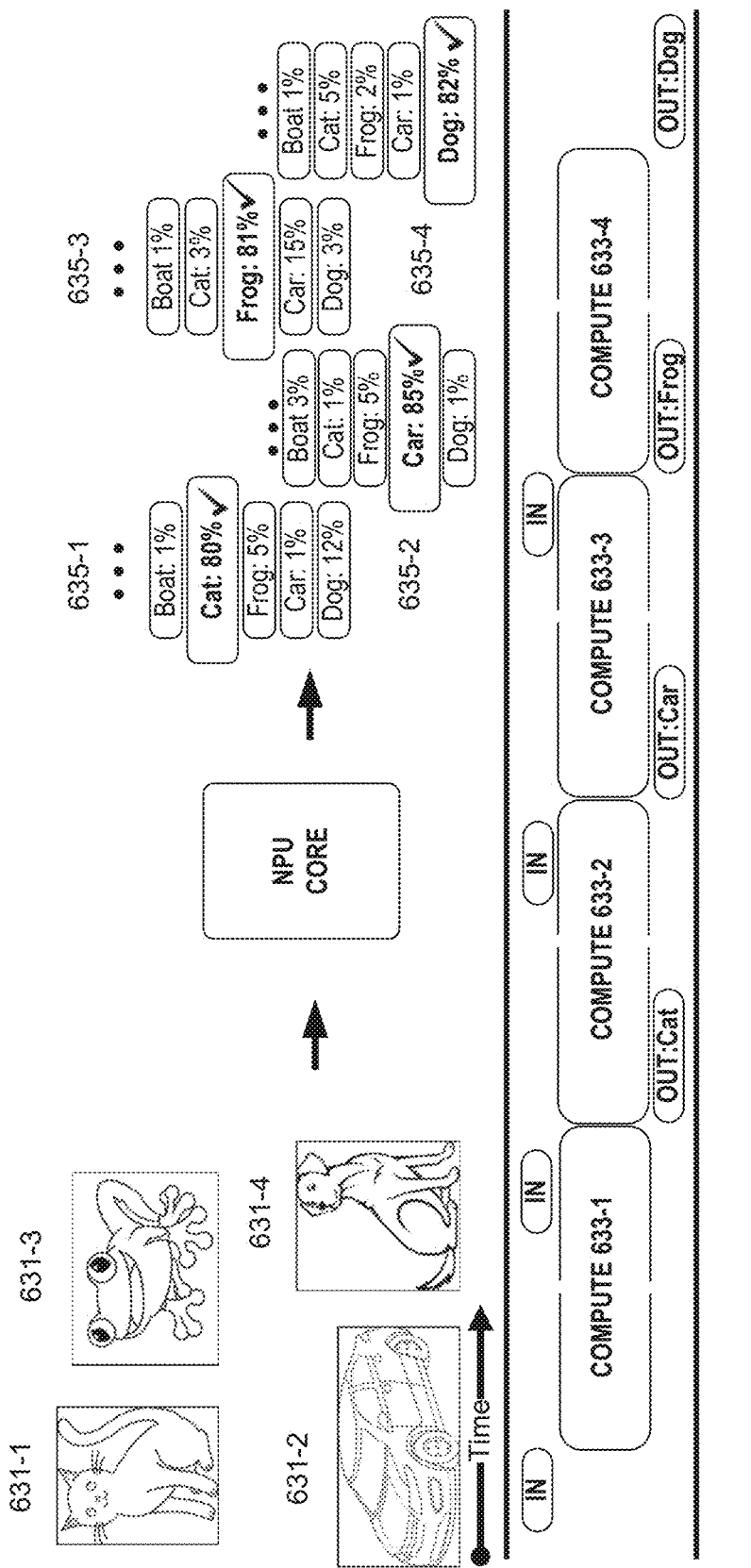
FIG. 6B is a schematic representation of an exemplary inference workflow of an NPU core, according to some embodiments of the present disclosure.

FIG. 6B illustrates an exemplary inference workflow 630 of an NPU core, according to some embodiments of the present disclosure. For example, the NPU core can be any one of NPU cores 402a-d of FIG. 4. Although inference workflow 630 relates to image recognition, it is appreciated that this is only an example rather than a limitation. As shown in FIG. 6B, the NPU core can receive a series of inputs, e.g., a first input image 631-1 of a cat, a second input image 631-2 of a car, a third input image 631-3 of a frog, and a fourth input image 631-4 of a dog. For example, a DMA unit (not shown) of the NPU core (e.g., DMA unit 408 of NPU core 402a as shown in FIG. 4) can communicate with outside components, such as accessing on-chip or off-chip memory, to receive input data. DMA unit can load the input date into local memory (not shown) of the NPU core (e.g., local memory 4022 of NPU core 402a as shown in FIG. 4). As shown in FIG. 6B, NPU core (e.g., DMA unit of the NPU core) can receive first input image 631-1 and execute a neural network to perform a first computation 633-1 on first input image 631-1. During first computation 633-1, NPU core can receive second input image 631-2. After first computation 633-1, NPU core can perform a second computation 633-2 on second input image 631-2. During second computation 633-2, NPU (e.g., DMA unit of the NPU core) can output a result (e.g., a first output 635-1) of first computation 633-1, e.g., an evaluation result of a cat, and also can receive third input image 631-3.

Similarly, after second computation 633-2, NPU core can perform a third computation 633-3 on third input image 631-3. During third computation 633-3, NPU can output a result (e.g., second output 635-2) of second computation 633-2, e.g., an evaluation result of a car, and also can receive fourth input image 631-4. After third computation 633-3, NPU core can perform a fourth computation 633-4 on fourth input image 631-4. During fourth computation 633-4, NPU can output a result (e.g., a third output 635-3) of third computation 633-3, e.g., an evaluation result of a frog. After fourth computation 633-4, NPU can output a result (e.g., a fourth output 635-4) of fourth computation 633-4, e.g., an evaluation result of a dog. Therefore, input of next input data and output of result of previous computation can be performed during current computation, and I/O latency can be effectively hidden with computation, and vice versa.

In some embodiments, the computation, e.g., computation 633-1, 633-2, 633-3, or 633-4, can be performed by cooperation of local memory 4022, sequencer 4028, operation unit 4020, convolution unit 4030, pooling unit 4032 and DMA unit 408a, in NPU core 402a of FIG. 4. With the cooperation, the computation can be performed without interruption. As depicted in FIG. 6B, the output, e.g., output 635-1, 635-2, 635-3, or 635-4 can include a plurality of possible evaluation items with respective probabilities. The item with highest probability (e.g., cat with a probability of 80%, car with a probability of 85%, frog with a probability of 81%, dog with a probability of 82%, or the like) can be determined as the final evaluation result. For example, DMA unit can send the output (e.g., evaluation results) to outside, such as another core, a host unit, on-chip or off-chip memory, or the like.

In some embodiments, two or more layers of a neural network or two or more operations of a neural network task can be fused or aggregated. The fused or aggregated layers or operations can be executed by an instruction that can be coarse-grain or high-level instruction. The coarse-grain instruction can reduce a cost for instruction stream processing and improve effective-computation per instruction.

In some embodiments, the coarse-grain instruction can contain a flag to control the instruction stream. For example, a convolution instruction "CONV" can include a modify flag that can allow in-line modification on fields of the instruction for runtime binding and control. A pooling instruction "POOL" can include a wait flag that can specify data dependency among layers. If the wait flag is not asserted, it can indicate that a layer associated with this instruction can be performed in parallel with a layer designated in the pooling instruction. A branch instruction "BR" can include a synchronization flag to coordinate jobs in different cores. Based on various flags of the instructions, operations of a neural network task can be performed together, in serial, or in parallel, making the instruction stream processing compact and efficient.

Figure 7:
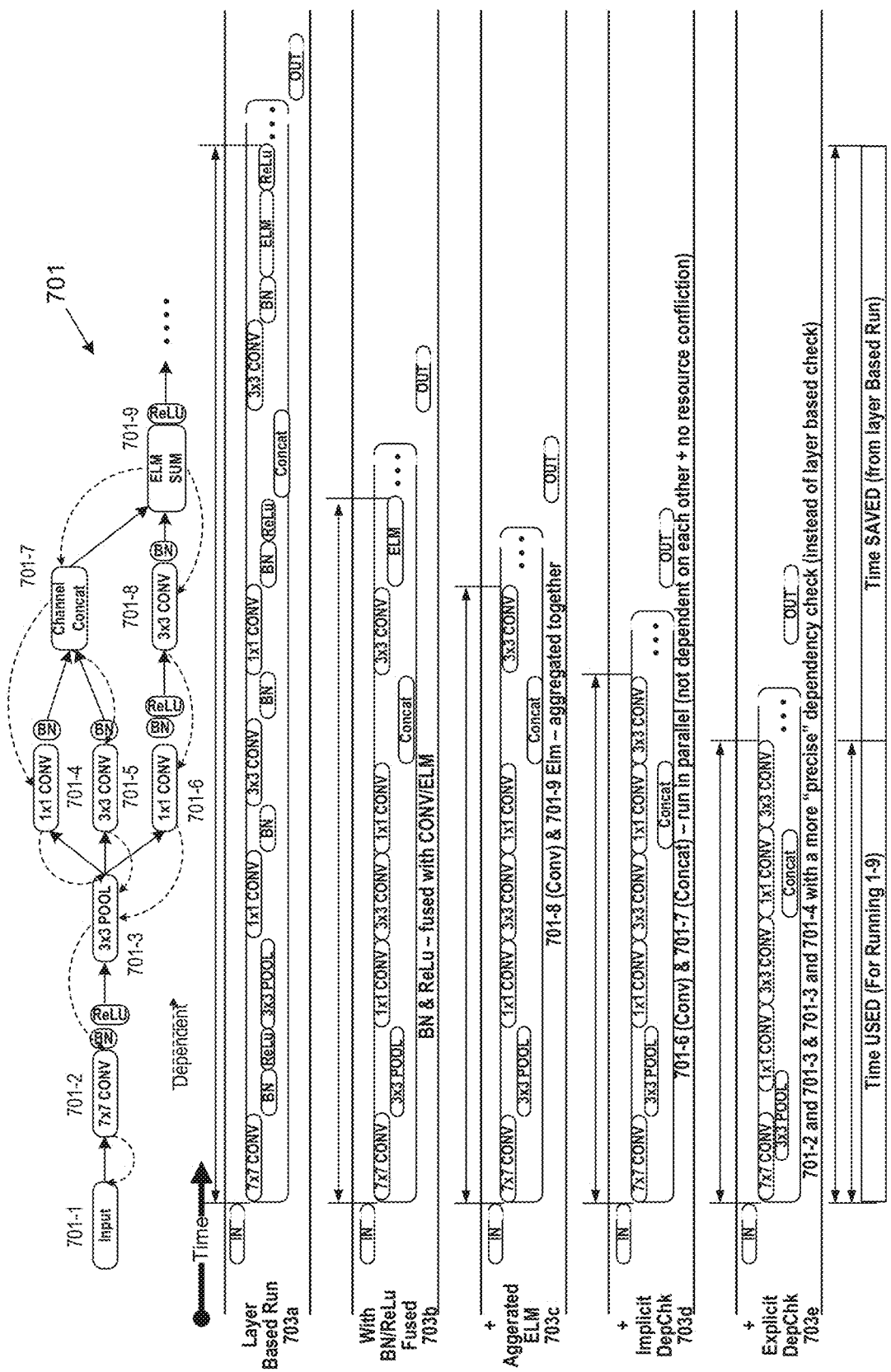
FIG. 7 is a schematic representation of workflows of an exemplary neural network, according to some embodiments of the present disclosure.

FIG. 7 illustrates workflows of an exemplary neural network 701, according to some embodiments of the present disclosure. As shown in FIG. 7, neural network 701 can include a plurality of building blocks, e.g., an input block 701-1, a 7×7 convolution (CONV) block 701-2, a 3×3 pooling (POOL) block 701-3, a 1×1 convolution block 701-4, a 3×3 convolution block 701-5, a 1×1 convolution block 701-6, a channel concatenation block 701-7, a 3×3 convolution block 701-8, an element-wise sum (ELM SUM) block 701-9, and the like. 7×7 convolution block 701-2 is connected to input block 701-1 and 3×3 pooling block

701-3. 3×3 pooling block 701-3 is connected to, in parallel, 1×1 convolution block 701-4, 3×3 convolution block 701-5 and a 1×1 convolution block 701-6. 1×1 convolution block 701-4 and 3×3 convolution block 701-5 are connected to channel concatenation block 701-7, and 1×1 convolution block 701-6 is connected to 3×3 convolution block 701-8. Channel concatenation block 701-7 and 3×3 convolution block 701-8 are connected to element-wise sum block 701-9. Element-wise sum block 701-9 can be connected to another block or layer. Neural network 701 can also include a plurality of batch normalization (BN) blocks and activation blocks (e.g., ReLU blocks). In FIG. 7, solid arrows can indicate data flow through neural network 701, and broken arrows can indicate dependent relationships between different blocks.

Neural network 701 can be executed by an NPU core (e.g., any one of NPU cores 402a-d of FIG. 4.). At workflow 703a, NPU core can receive an input at input block 701-1. Then, NPU core can perform 7×7 convolution on input at 7×7 convolution block 701-2, followed by BN and ReLU at BN block and ReLU block, respectively. NPU core can perform 3×3 pooling on result of ReLU block at 3×3 pooling block 701-3. With result of the 3×3 pooling, NPU core can perform 1×1 convolution at 1×1 convolution block 701-4 followed by a BN operation, 3×3 convolution at 3×3 convolution block 701-5 followed by a BN operation, and 1×1 convolution at 1×1 convolution block 701-6 followed by BN and ReLU operations. At channel concatenation block 701-7, NPU core can perform a concatenation of outputs from the BN block after 1×1 convolution block 701-4 and the BN block after 3×3 convolution block 701-5. At 3×3 convolution block 701-8, NPU core can perform a convolution on an output from the ReLU block after 1×1 convolution block 701-6, followed by a BN operation. At element-wise sum block 701-9, NPU core can sum outputs from channel concatenation block 701-7 and the BN block after 3×3 convolution block 701-8, followed by a ReLU operation. NPU core can also perform other operations at other blocks or layers and produce an output. Workflow 703a can be based on blocks or layers, and performed by NPU in a straight-forward manner. in some embodiments, operations in first row of workflow 703a, e.g., convolutions, can be performed by convolution unit (e.g., convolution unit 4030 of FIG. 4). Operations in second row of workflow 703a, e.g., BN operation, ReLU operation, element-wise operation, and pooling, can be performed by pooling unit (e.g., pooling unit 4032 of FIG. 4), DP (e.g., DP 4024 of FIG. 4), element-wise operation unit (e.g., element-wise operation unit 4026 of FIG. 4), and the like. Operations in third row of workflow 703a, e.g., concatenation, can be performed by DMA unit (e.g., DMA unit 408a of FIG. 4).

At workflow 703b, NPU core can fuse BN operation and ReLU operation with convolution or element-wise operation. For example, a result of convolution can be passed to element-wise operation unit for further processing, e.g., BN or other element-wise operation, without storing it in LMs. As shown in FIG. 7, at workflow 703b, NPU core can perform, in series, 7×7 convolution, 3×3 pooling, 1×1 convolution, 3×3 convolution, 1×1 convolution, concatenation, 3×3 convolution, element-wise operation, and the like. Therefore, compared with workflow 703a, at workflow 703b, time for executing neural network 701 can be reduced.

At workflow 703c, NPU core can aggregate a convolution (e.g., convolution at 3×3 convolution block 701-8) with an element-wise operation (e.g., element-wise operation at element-wise sum block 701-9). For example, a result of convolution can be passed to element-wise operation unit for element-wise operation without storing it in LMs. As shown in FIG. 7, at workflow 703c, NPU core can perform, in series, 7×7 convolution, 3×3 pooling, 1×1 convolution, 3×3 convolution, 1×1 convolution, concatenation, 3×3 convolution, and the like. Therefore, compared with workflow 703b, at workflow 703c, time for executing neural network 701 can be further reduced.

At workflow 703d, NPU core can perform a convolution (e.g., convolution at 1×1 convolution block 701-6) and a concatenation (e.g., concatenation at channel concatenation block 701-7) in parallel if the convolution and the concatenation are not dependent on each other and there is no resource confliction therebetween. As shown in FIG. 7, at workflow 703d, NPU core can perfoiin, in series, 7×7 convolution, 3×3 pooling, 1×1 convolution, 3×3 convolution, 1×1 convolution in parallel with concatenation, 3×3 convolution, and the like. Therefore, compared with workflow 703c, at workflow 703d, time for executing neural network 701 can be further reduced.

At workflow 703e, NPU core can perform a pooling (e.g., pooling at 3×3 pooling block 701-3), at least partly, in parallel with convolution before it (e.g., convolution at 7×7 convolution block 701-2) or convolution after it (e.g., convolution at 1×1 convolution block 701-4). For example, NPU core (e.g., a sequencer) can monitor a result of convolution before pooling. If a part of the result is ready, pooling unit can perform pooling operations on the part of result. NPU core can also monitor a result of pooling before convolution. If a part of the result is ready, convolution unit can perform convolution operation on the part of result. As shown in FIG. 7, at workflow 703e, NPU core can perform, in series, 7×7 convolution partly in parallel with 3×3 pooling, remaining part of the 3×3 pooling partly in parallel with 1×1 convolution, remaining part of the 1×1 convolution, 3×3 convolution, 1×1 convolution in parallel with concatenation, 3×3 convolution, and the like. Therefore, compared with workflow 703d, at workflow 703e, time for executing neural network 701 can be further reduced.

Figure 8:
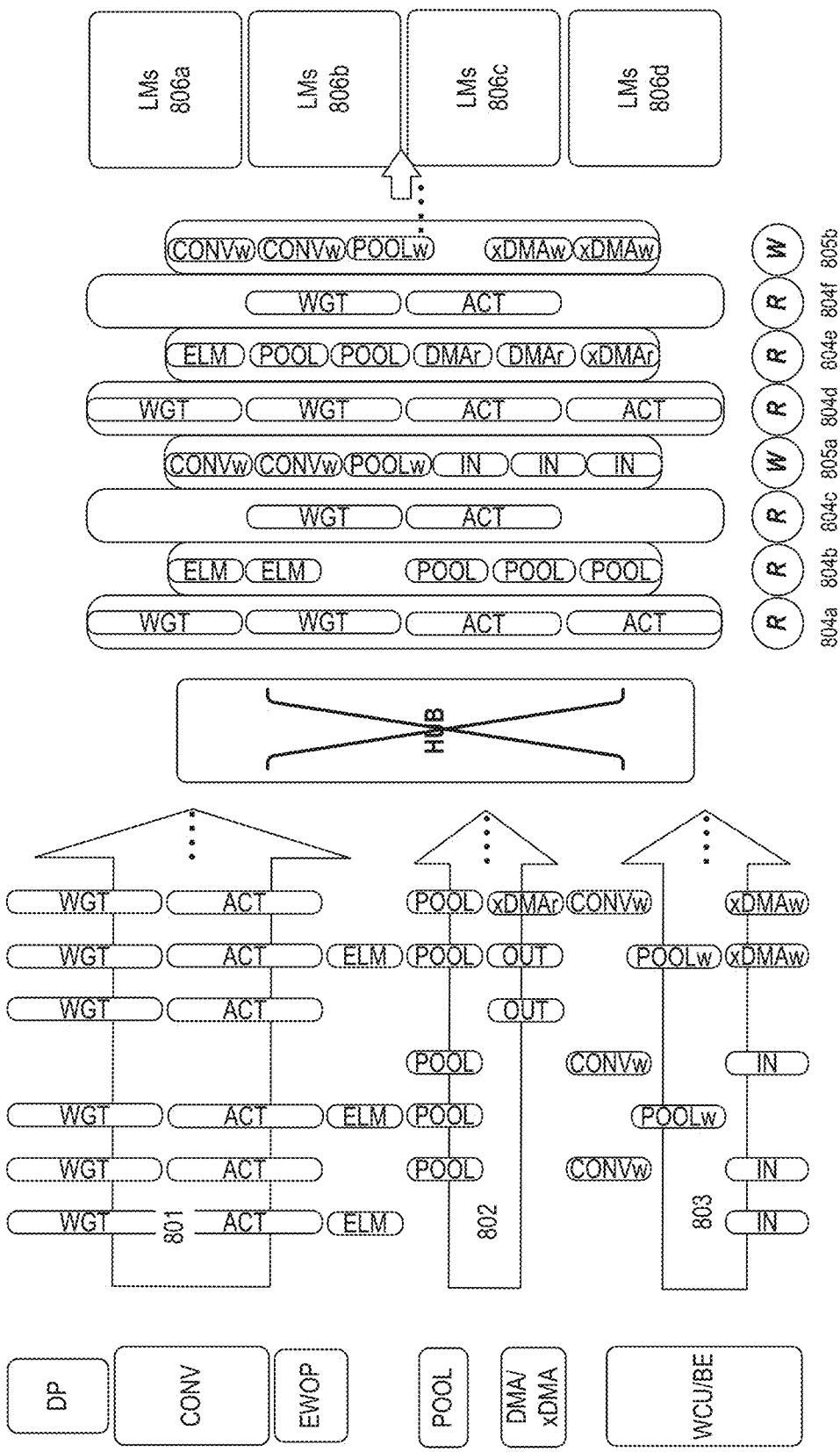
FIG. 8 is a schematic representation of an exemplary data movement in an NPU core, according to some embodiments of the present disclosure.

FIG. 8 illustrates a schematic representation of an exemplary data movement 800 in an NPU core, according to some embodiments of the present disclosure. The NPU core can include LMs and HUB system. LM can store data for a plurality of operations. The HUB system can support multiple data streams simultaneously. For example, data movement 800 can be implemented by DP 4024, EWOP unit 4026, convolution unit 4030, pooling unit 4032, DMA unit 408a, LMs 4022 and HUB system of NPU core 402a of FIG. 4.

As shown in FIG. 8, there can be a plurality of data streams in NPU core, e.g., a convolution read data stream 801, a pool/DAM/out read data stream 802, an in/engine write data stream 803, and the like. Convolution read data stream 801 can involve one or more components, such as DP (e.g., DP 4024 of FIG. 4), convolution unit (e.g., convolution unit 4030 of FIG. 4), and EWOP unit (e.g., EWOP unit 4026 of FIG. 4). Therefore, convolution read data stream 801 can include a plurality of read data from LMs 806a-806d (e.g., LMs 4022 of FIG. 4), such as weight data (WGT), data for activation (ACT) and data for element-wise operation (ELM). Pool/DAM/out read data stream 802 can involve one or more components, such as pooling unit (e.g., pooling unit 4032 of FIG. 4), DMA unit or xDMA unit (e.g., DMA unit 408a of FIG. 4), and the like. Therefore, pool/DAM/out read data stream 802 can include a plurality of read data from LMs 806a-806d (e.g., LMs 4022 of FIG. 4), such as data for pooling (POOL), output data (OUT), cross-core read data (xDMAr), and the like. In/engine write data stream 803 can involve one or more components, such as write control unit or behind end (WCU/BE), and the like. For example, WCU/BE can include WCU or BE for convolution engine (e.g., convolution unit 4030 of FIG. 4), pooling unit (e.g., pooling unit 4032 of FIG. 4), DMA unit (e.g., DMA unit 408a of FIG. 4), or the like. Pool/DAM/out read data stream 802 can include a plurality of write data to LMs 806a-806d (e.g., LMs 4022 of FIG. 4), such as convolution write data (CONVw), pooling write data (POOLw), input data (IN) (e.g., input data from host unit), cross-core write data (xDMAw), and the like.

HUB system (e.g., HUB system of NPU core 402a of FIG. 4) can coordinate a plurality of data stream from or to LMs (e.g., LMs 806a-d) and form multiple read data bands and write data bands. As shown in FIG. 8, data movement 800 can include, after coordination of HUB system, read data bands 804a-f, and write data bands 805a-b. Read data band 804a, 804c, 804d, and 804f each can include one or more weights, activation data, and the like. Read data band 804b can include data for element-wise operation and pooling, and the like. Write data band 805a can include one or more convolution write data, pooling write data, input data, and the like. Read data band 804e can include data for element-wise operation and pooling, DMA read data, cross-core read data, and the like. Write data band 805b can include one or more convolution write data, pooling write data, cross-core write data (xDMAw), and the like.

In some embodiments, with cooperation of HUB system with other components, NPU core can exploit data locality and channel coalescing and provide a well-balanced bandwidth, computation, or parallel multi-tasking solution.

Figure 9:
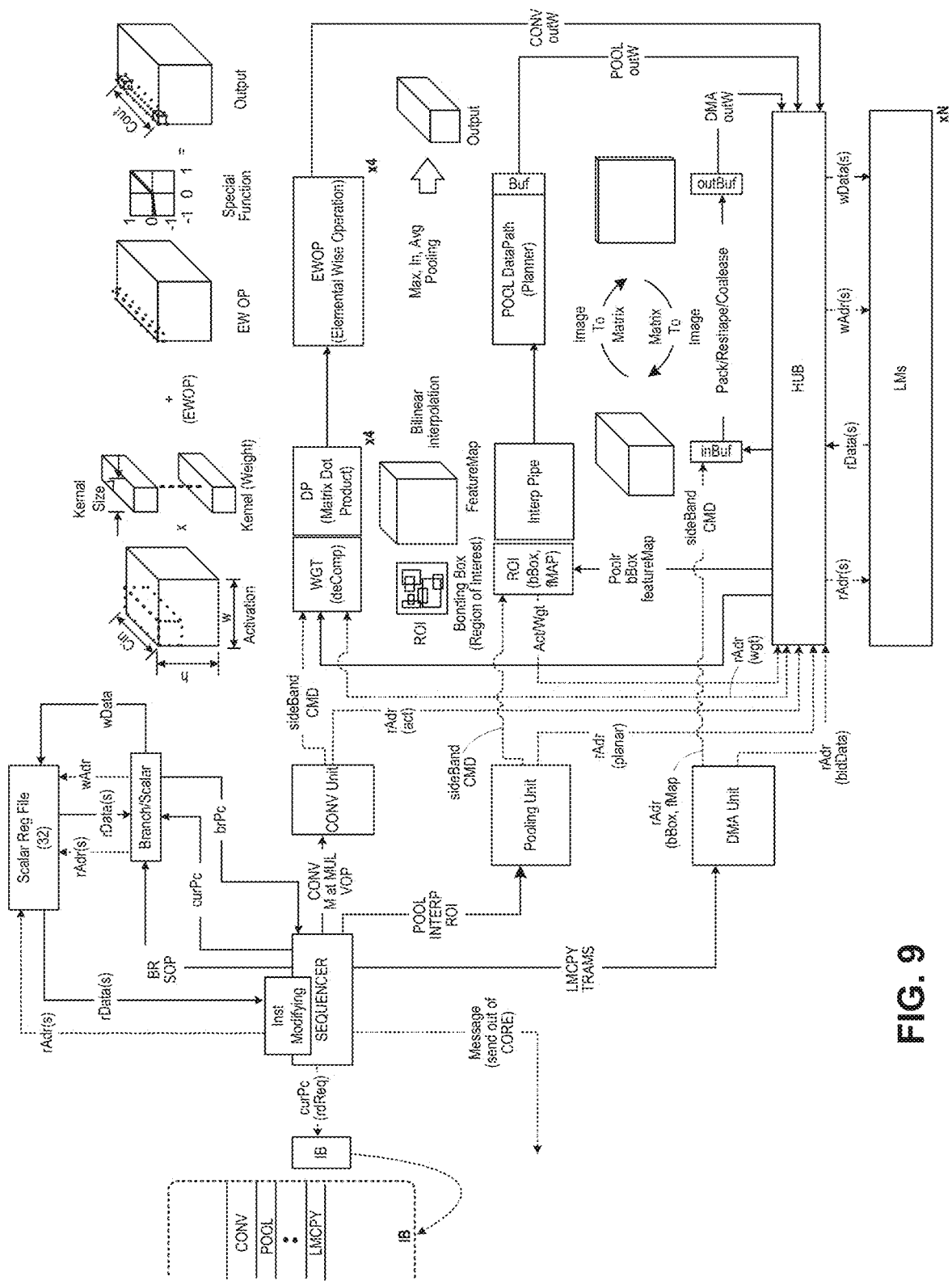
FIG. 9 illustrates a schematic diagram of workflows among processing units of an NPU core, according to some embodiments of the present disclosure.

FIG. 9 illustrates a schematic diagram of workflows among processing units of an NPU core, according to some embodiments of the disclosure.

As shown in FIG. 9, a sequencer (e.g., sequencer 4028 of FIG. 4) can retrieve instructions from an instruction buffer and distribute the instructions to the processing units of an NPU core (e.g., NPU core 402a of FIG. 4), In some embodiments, the sequencer can also modify the instructions before sending them out. The modified instructions can be sent to a convolution unit (e.g., convolution unit 4030 of FIG. 4) for convolution operations, a pooling unit (e.g., pooling unit 4032 of FIG. 4) for pooling operations, and a DMA unit (e.g., DMA unit 408a of FIG. 4) for data transferring, respectively.

For example, the convolution unit can be coupled with the sequencer, a matrix multiplication data path (e.g., data path 4024 of FIG. 4), and an element-wise operation unit (e.g., element-wise operation unit 4026 of FIG. 4), and configured to instruct the matrix multiplication data path and the element-wise operation unit to perform convolution operations. in some embodiments, the convolution unit can also send commands to a local memory (e.g., local memory 4022) to send activation data and weight data to the data path for performing the convolution operations. For example, the convolution unit can send a read address of the weight data to the local memory and retrieve the corresponding weight data from the local memory via the DMA unit and the data fabric and arbitration sub-system. Then, the data path can perform matrix multiplication on the activation data and the weight data. It is appreciated that more than one data path can work together to generate results of the matrix multiplication. As shown in FIG. 9, the matrix multiplication can be performed by four data paths. The element-wise operation unit can further process the results of the matrix multiplication to generate a feature map as a convolution output. The feature map can be temporarily stored to the local memory via, e.g., the DMA unit.

The pooling unit can further include an interpolation unit, a pooling data path, and the like, and configured to perform pooling operations. In some embodiments, the interpolation unit can perform interpolation (e.g., bilinear interpolation) on the feature map before pooling. Then, the interpolated feature map can be pooled, according to a pool size, to generate a pooling output. For example, a max pooling or an average pooling can be performed on the feature map. The pooling output can also be temporarily stored to the local memory via, e.g., the DMA unit.

In addition to transferring matrices, feature maps, and the like among these processing units and NPU cores, the DMA unit can also reshape, pack, and coalesce data. In some embodiments, the DMA unit can transform an image into a matrix, and vice versa. For example, data in an image form can be used in a convolution operation, and data in a matrix form can be used in a matrix operation (e.g., matrix-matrix multiplication).

Below Table 1 further illustrates a list of key characteristics of NPU 400.

TABLE 1

| NPU 400 | |
|---|---|
| I/O | |
| Host Interface: PCIe4.0x16 | 32 + 32 GB/s |
| On-chip: xCore COMM | ~150+ GB/s |
| Key Top Level Components | |
| NPU-Core | x4 |
| Command Parser (CP) | x1 |
| Total Computing Power | |
| INT8 based matrix multiplication | ~800 Tera Ops |
| FP16+/BF16+ accumulation and elemental operation | ~5 Tera Ops |
| Implementation Info | |
| Fabricated Process | TSMC N12 |
| Total number of Transistors~ | ~15 Billion |

Figure 10:
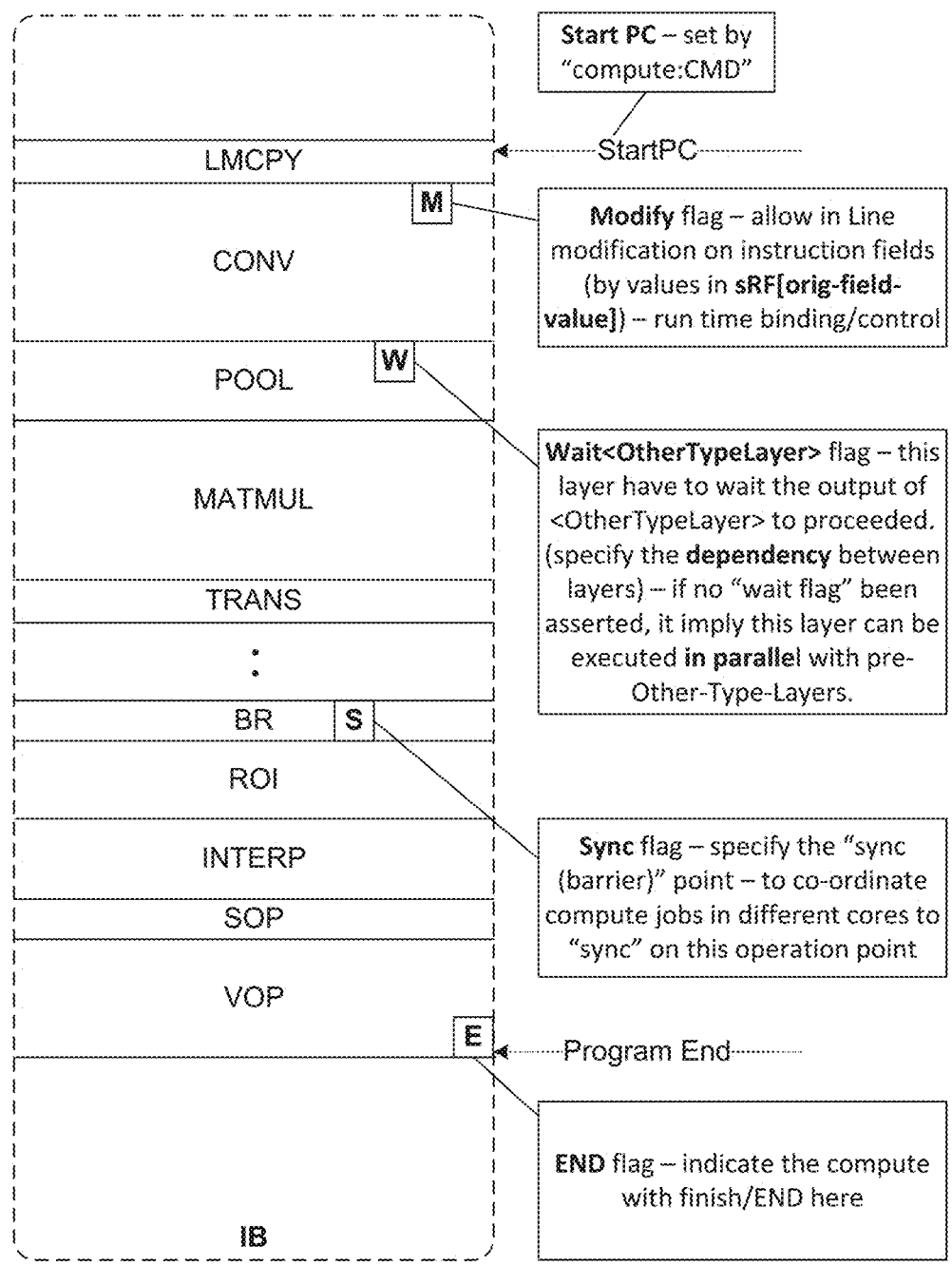
FIG. 10 is a schematic representation of exemplary instructions of an NPU, according to some embodiments of the present disclosure.

FIG. 10 illustrates exemplary instructions of NPU 400, according to some embodiments of the disclosure.

As discussed above, the instructions can be sent to the convolution unit, the pooling unit, and the DMA unit, to cause these units to perform a variety of operations of a neural network task. As shown in FIG. 10, the instructions can be stored in an instruction buffer, including, but not being limited to, "LMCPY," "CONV," "POOL," "MATMUL," "TRANS," "BR," "ROI," "INTERP," "SOP," and "VOP." An instruction in the instruction buffer can be located though a pointer to an address of the instruction. For example, the pointer to the address of the instruction can be determined based on a program counter. The program counter can be initialized and can include an address of a next instruction. In FIG. 10, a start program counter is initialized to be a start address of an instruction "LMCPY." When an instruction has been executed, the program counter can point to a next instruction. In some embodiments, the program counter can jump to a next instruction by a label distance.

Instruction "LMCPY" is a local memory copy instruction, and can be used to perform a local memory copy operation. For example, the instruction "LMCPY" can cause the DMA unit to copy block data from a read address and send the block data to a write address.

Instruction "CONN" is a convolution instruction and can be used to instruct a convolution unit to perform a convolution operation. The instruction "CONV" can include a modify flag field, allowing in-line modification on fields of the instruction for runtime binding and control. The modify flag field can be a one-bit field.

Instruction "POOL" is a pooling instruction and can be used to instruct a pooling unit to perform a pooling operation. The instruction "POOL" can include a wait flag field, indicating the pooling operation of a layer has to wait for an output of a designated layer before proceeding. Therefore, the wait flag field can include a wait flag and the designated layer. In other words, the wait flag field can specify data dependency among layers. If no wait flag is asserted in the wait flag field, it can indicate that a layer associated with this instruction can be performed in parallel with a layer designated in the wait flag field.

Instruction "MATMUL" is a matrix multiplication instruction and can be used to instruct a matrix multiplication data path to perform matrix multiplication.

Instruction "TRANS" is a transform instruction and can be used to instruction a DMA unit to transform an image to a matrix, and vice versa.

Instruction "BR" is a branch instruction and can be used to modify the program counter to point at a designated address of a next instruction. In some embodiments, the instruction "BR" can include a synchronization field to coordinate jobs in different cores. The synchronization field can be a one-bit field and can also be referred to as a barrier flag or a synchronization flag. In some embodiments, when a core finishes its job, the core can assert the synchronization field to notify the NPU that the job has been finished. Then the core can be suspended until other cores also finish their jobs and be assigned with a new job. Therefore, a neural network task can be divided and assigned to different cores for parallel computation.

Instruction "ROI" is a region setting instruction and can be used to indicate a region of interest (ROI). In some embodiments, a region of interest can be determined for pooling to improve accuracy of inference. The instruction "ROI" can specify at least one ROI and coordinates of the number of the at least one ROI. The coordinates of a ROI can include four pairs of coordinates of four corners of the ROI.

Instruction "INTERP" is an interpolation instruction and can be used to a pooling unit to perform interpolation on a feature map. For example, the interpolation can be a bilinear interpolation.

Instruction "SOP" is a scalar operation instruction and can be used to perform a scalar operation. For example, a scalar operation can be performed to determine a branch program counter based on a current program counter and a label distance. In some embodiments, the instruction "SOP" can be executed by a branch/scalar unit, and the scalar operation result can be stored in a scalar register file, as shown in FIG. 9.

Instruction "VOP" is a vector instruction and can be used to perform a vector operation. For example, the instruction "VOP" can cause an element-wise operation unit to perform the vector operation, such as addition, vector-vector multiplication, and the like. In some embodiments, the instruction "VOP" can also include an "end" field to indicate the neural network task is finished or the variety of operations of the neural network task end here.

As the instructions of NPU 400 are designed to provide additional options and flags for optimization turning, high quality result can be achieved without going through tedious and usually less effective procedures (such as library searching and low-level assembly tuning).

Figure 11:
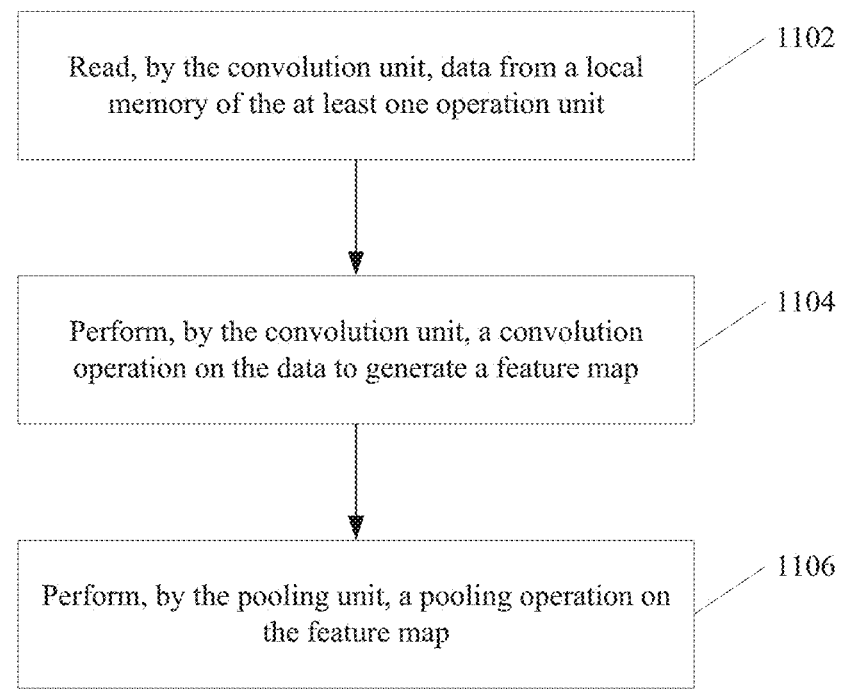
FIG. 11 illustrates a flowchart of an exemplary method implemented by a processing unit, according to some embodiments of the present disclosure.

FIG. 11 illustrates a flowchart of an exemplary method 1100 implemented by a processing unit, according to some embodiments of the present disclosure. In some embodiments, method 1100 can be perfonned by NPU 400 of FIG. 4, FIG. 5A, or FIG. 5C. In some embodiments, method 1100 can be implemented by a computer program product, embodied in a computer-readable medium, including computer-executable instructions, such as program code, executed by computers (e.g., NPU 400 of FIG. 4, FIG. 5A, or FIG. 5C).

In some embodiments, the processing unit can include a command parser (e.g., CP 406 of FIG. 4) configured to dispatch commands and computing tasks and at least one core (e.g., NPU core 402a, 402b, 402c, or 402d of FIG. 4) communicatively coupled with the command parser and configured to process the dispatched computing task. Each core can include a convolution unit (e.g., convolution unit 4030 of FIG. 4), a pooling unit (e.g., pooling unit 4032 of FIG. 4), at least one operation unit (e.g., operation unit 4020 of FIG. 4) and a sequencer (e.g., sequencer 4028 of FIG. 4). The sequencer can be communicatively coupled with the convolution unit, the pooling unit, and the at least one operation unit and configured to distribute instructions of the dispatched computing task to the convolution unit, the pooling unit, and the at least one operation unit for execution.

At step 1102, the convolution unit can read data from a local memory (e.g., local memory 4022 of FIG. 4) of the at least one operation unit.

At step 1104, the convolution unit can perform a convolution operation on the data to generate a feature map. For example, the convolution unit can be configured, by a convolution instruction, to perform the convolution operation to generate the feature map. in some embodiments, the convolution instruction can include a modify flag field associated with in-line modification on fields of the convolution instruction for runtime binding and control.

At step 1106, the pooling unit can perform a pooling operation on the feature map. In some embodiments, the pooling unit can include an interpolation unit and a pooling data path. The interpolation unit can interpolate the feature map (e.g., by execution of an interpolation instruction). The pooling data path can perform a pooling operation (e.g., by execution of a pooling instruction) on the interpolated feature map. The pooling unit can determine a region of interest on the feature map (e.g., by execution of a region setting instruction).

In some embodiments, the at least one operation unit can include a matrix multiplication DP (e.g., data path 4024 of FIG. 4) and an EWOP unit (e.g., EWOP unit 4026 of FIG. 4). The matrix multiplication DP can perform a matrix multiplication operation (e.g., by execution of a matrix multiplication instruction) on convolution data from the convolution unit to generate intermediate data, and the EWOP unit can perform an EWOP (e.g., by execution of a vector instruction) to generate a feature map based on the intermediate data.

In some embodiments, the sequencer can monitor execution of a neural network task and parallelize sub-tasks of the neural network task. For example, the sequencer can use a synchronization field of a branch instruction to coordinate sub-tasks of the neural network task in different cores.

In some embodiments, each core can further include a DMA unit (e.g., DMA 408a of FIG. 4). The DMA unit can transfer data within each core and among the at least one core. For example, the DMA unit can be configured, by a local memory copy instruction, to transfer data within the core. In some embodiments, the DMA unit can input or output data (e.g., by execution of a copy instruction) in parallel with computation of the convolution unit, the pooling unit, or the at least one operation unit. In some embodiments, the DMA unit can transform data between forms of an image and a matrix (e.g., by execution of a transform instruction).

In some embodiments, the pooling unit can perform the pooling operation at least partly in parallel with the convolution operation of the convolution unit. For example, the pooling unit can be configured, by a wait flag field of the pooling instruction, to perform the pooling operation at least partly in parallel the convolution operation of the convolution unit.

In some embodiments, each core can further include a scalar unit and a scalar register file. The scalar unit can perform a scalar operation (e.g., by execution of a scalar operation instruction) and write a result of the scalar operation in the scalar register file.

Embodiments of the present disclosure can be applied to many products, environments, and scenarios. For example, some embodiments of the present disclosure can be applied to Ali-NPU (e.g., Hanguang NPU), Ali-Cloud, Ali PIM-AI (Processor-in Memory for AI), Ali-DPU (Database Acceleration Unit), Ali-AI platform, GPU, a tensor processing units (TPU), or the like.

The embodiments may further be described using the following clauses:

1. A method implemented by a processing unit, the processing unit comprising a command parser configured to dispatch commands and computing tasks and at least one core communicatively coupled with the command parser and configured to process the dispatched computing task, each core comprising a convolution unit, a pooling unit, at least one operation unit and a sequencer communicatively coupled with the convolution unit, the pooling unit, and the at least one operation unit and configured to distribute instructions of the dispatched computing task to the convolution unit, the pooling unit, and the at least one operation unit for execution, the method comprising:
reading, by the convolution unit, data from a local memory of the at least one operation unit;
performing, by the convolution unit, a convolution operation on the data to generate a feature map; and performing, by the pooling unit, a pooling operation on the feature map.

2. The method according to clause 1, wherein the at least one operation unit comprises: a matrix multiplication data path (DP) and an element-wise operation (EWOP) unit, and the method further comprises:
performing, by the matrix multiplication DP, a matrix multiplication operation on convolution data from the convolution unit to generate intermediate data; and
performing, by the EWOP unit, an EWOP to generate a feature map based on the intermediate data.

3. The method according to any one of clauses 1 and 2, wherein the pooling unit comprises an interpolation unit and a pooling data path, and the method further comprises:
interpolating, by the interpolation unit, the feature map; and
performing, by the pooling data path, a pooling operation on the interpolated feature map.

4. The method according to clause 3, further comprising:
determining, by the pooling unit, a region of interest on the feature map.

5. The method according to any one of clauses 1-4, further comprising:
monitoring, by the sequencer, execution of a neural network task; and.
parallelizing, by the sequencer, sub-tasks of the neural network task.

6. The method according to any of clauses 1-5, wherein each core further comprises a direct memory access (DMA) unit, and the method further comprises:
transferring, by the DMA unit, data within each core and among the at least one core.

7. The method according to clause 6, further comprising:
inputting or outputting, by the DMA unit, data in parallel with computation of the convolution unit, the pooling unit, or the at least one operation unit.

8. The method according to any of clauses 6 and 7, further comprising:
transforming, by the DMA unit, data between forms of an image and a matrix.

9. The method according to any of clauses 1-8, further comprising:
performing, by the pooling unit, the pooling operation at least partly in parallel the convolution operation of the convolution unit.

10. The method according to any of clauses 1-9, wherein each core further comprises a scalar unit and a scalar register file, and the method further comprises:
performing, by the scalar unit, a scalar operation; and
writing, by the scalar unit, a result of the scalar operation in the scalar register file.

11. A non-transitory computer-readable storage medium storing a set of instructions that is executable by at least one processing unit to cause the computer to perform a method, the processing unit comprising a command parser configured to dispatch commands and computing tasks and at least one core communicatively coupled with the command parser and configured to process the dispatched computing task, each core comprising a convolution unit, a pooling unit, at least one operation unit and a sequencer communicatively coupled with the convolution unit, the pooling unit, and the at least one operation unit and configured to distribute instructions of the dispatched computing task to the convolution unit, the pooling unit, and the at least one operation unit for execution, the method comprising:
reading, by the convolution unit, data from a local memory of the at least one operation unit;
performing, by the convolution unit, a convolution operation on the data to generate a feature map; and
performing, by the pooling unit, a pooling operation on the feature map.

12. The non-transitory computer-readable storage medium according to clause 11, wherein the at least one operation unit comprises: a matrix multiplication data path (DP) and an element-wise operation (EWOP) unit, and the set of instructions is executable by at least one processing unit to cause the computer to perform:
performing, by the matrix multiplication DP, a matrix multiplication operation on convolution data from the convolution unit to generate intermediate data; and
performing, by the EWOP unit, an EWOP to generate a feature map based on the intermediate data.

13. The non-transitory computer-readable storage medium according to any one of clauses 11 and 12, wherein the pooling unit comprises an interpolation unit and a pooling data path, and the set of instructions is executable by at least one processing unit to cause the computer to perform:

interpolating, by the interpolation unit, the feature map; and performing, by the pooling data path, a pooling operation on the interpolated feature map.

14. The non-transitory computer-readable storage medium according to clause 13, wherein the set of instructions is executable by at least one processing unit to cause the computer to perform:

determining, by the pooling unit, a region of interest on the feature map.

15. The non-transitory computer-readable storage medium according to any one of clauses 11-14, wherein the set of instructions is executable by at least one processing unit to cause the computer to perform:

monitoring, by the sequencer, execution of a neural network task; and parallelizing, by the sequencer, sub-tasks of the neural network task.

16. The non-transitory computer-readable storage medium according to any of clauses 11-15, wherein each core further comprises a direct memory access (DMA) unit, and the set of instructions is executable by at least one processing unit to cause the computer to perform:

transferring, by the DMA unit, data within each core and among the at least one core.

17. The non-transitory computer-readable storage medium according to clause 16, wherein the set of instructions is executable by at least one processing unit to cause the computer to perform:

inputting or outputting, by the DMA unit, data in parallel with computation of the convolution unit, the pooling unit, or the at least one operation unit.

18. The non-transitory computer-readable storage medium according to any of clauses 16 and 17, wherein the set of instructions is executable by at least one processing unit to cause the computer to perform:

transforming, by the DMA unit, data between forms of an image and a matrix.

19. The non-transitory computer-readable storage medium according to any of clauses 11-18, wherein the set of instructions is executable by at least one processing unit to cause the computer to perform:

performing, by the pooling unit, the pooling operation at least partly in parallel the convolution operation of the convolution unit.

20. The non-transitory computer-readable storage medium according to any of clauses 11-19, wherein each core further comprises a scalar unit and a scalar register file, and the set of instructions is executable by at least one processing unit to cause the computer to perform:

performing, by the scalar unit, a scalar operation; and writing, by the scalar unit, a result of the scalar operation in the scalar register file.

21. A processing unit, comprising:

a command parser configured to dispatch commands and computing tasks; and at least one core communicatively coupled with the command parser and configured to process the dispatched computing task, each core comprising:

a convolution unit having circuitry configured, by a convolution instruction, to perform a convolution operation to generate a feature map;

a pooling unit having circuitry configured, by a pooling instruction, to perform a pooling operation on the feature map;

at least one operation unit having circuitry configured to process data; and a sequencer communicatively coupled with the convolution unit, the pooling unit, and the at least one operation unit, and having circuitry configured to distribute instructions of the dispatched computing task to the convolution unit, the pooling unit, and the at least one operation unit for execution.

22. The processing unit according to clause 21, wherein the at least one operation unit comprises:

a local memory for storing data;

a matrix multiplication data path (DP) having circuitry configured, by a matrix multiplication instruction, to perform a matrix multiplication operation; and an element-wise operation (EWOP) unit having circuitry configured, by a vector instruction, to perform an EWOP.

23. The processing unit according to clause 22, wherein the matrix multiplication DP has circuitry configured, by the matrix multiplication instruction, to perform matrix multiplication operation on convolution data from the convolution unit to generate intermediate data, and the EWOP unit has circuitry configured, by the vector instruction, to generate a feature map based on the intermediate data.

24. The processing unit according to any one of clauses 22 and 23, wherein each core further comprises:

a HUB unit having circuitry configured to communicate read data and write data associated with a neural network task between the convolution unit, the pooling unit, the at least one operation unit and the local memory.

25. The processing unit of any of clauses 22-24, wherein the vector instruction further comprises an end field to indicate the neural network task is finished.

26. The processing unit according to any one of clauses 21-25, wherein the pooling unit further comprises:

an interpolation unit having circuitry configured, by an interpolation instruction, to interpolate the feature map; and a pooling data path having circuitry configured, by a pooling instruction, to perform a pooling operation on the interpolated feature map.

27. The processing unit according to any one of clauses 21-26, wherein the sequencer further has circuitry configured to monitor execution of a neural network task and to use a synchronization field of a branch instruction to coordinate sub-tasks of the neural network task in different cores.

28. The processing unit according to any of clauses 21-27, wherein each core further comprises:

an instruction buffer communicatively coupled to the sequencer.

29. The processing unit according to any of clauses 21-28, wherein each core further comprises:

a direct memory access (DMA) unit having circuitry configured, by a local memory copy instruction, to transfer data within the core.

30. The processing unit according to clause 29, wherein the DMA unit has circuitry configured, by a copy instruction, to input or output data in parallel with computation of the convolution unit, the pooling unit, or the at least one operation unit.

31. The processing unit according to any of clauses 29 and 30, wherein the DMA unit has circuitry configured, by a transform instruction, to transform data between forms of an image and a matrix.

32. The processing unit according to any of clauses 21-31, wherein the pooling unit has circuitry configured, by a wait flag field of the pooling instruction, to perform the pooling operation at least partly in parallel the convolution operation of the convolution unit.

33. The processing unit according to any of clauses 21-32, wherein the pooling unit has circuitry configured, by a region setting instruction, to determine a region of interest on the feature map.

34. The processing unit according to any of clauses 21-33, wherein each core further comprises a scalar unit and a scalar register file, and the scalar unit has circuitry configured, by a scalar operation instruction, to perform a scalar operation and write a result of the scalar operation in the scalar register file.

35. The processing unit of any of clauses 21-34, wherein the convolution instruction further comprises a modify flag field associated with in-line modification on fields of the convolution instruction for runtime binding and control.

The various example embodiments described herein are described in the general context of method steps or processes, which may be implemented in one aspect by a computer program product, embodied in a computer readable medium, including computer-executable instructions, such as program code, executed by computers in networked environments. A computer readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, features, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A method implemented by a processing unit, the processing unit comprising a command parser having circuitry configured to dispatch commands and computing tasks and at least one core communicatively coupled with the command parser and configured to process the dispatched computing task, each core comprising a convolution unit, a pooling unit, at least one operation unit and a sequencer communicatively coupled with the convolution unit, the pooling unit, and the at least one operation unit and having circuitry configured to distribute instructions of the dispatched computing task to the convolution unit, the pooling unit, and the at least one operation unit for execution, the sequencer further comprising circuitry configured to modify the instructions of the core; the method comprising:
   reading, by the convolution unit, data from a local memory of the at least one operation unit;
   performing, by the convolution unit, a convolution operation on the data to generate a feature map; and
   performing, by the pooling unit, a pooling operation on the feature map.

2. The method according to claim 1, wherein the at least one operation unit comprises: a matrix multiplication data path (DP) and an element-wise operation (EWOP) unit, and the method further comprises:
   performing, by the matrix multiplication DP, a matrix multiplication operation on convolution data from the convolution unit to generate intermediate data; and
   performing, by the EWOP unit, an EWOP to generate the feature map based on the intermediate data.

3. The method according to claim 1, wherein the pooling unit comprises an interpolation unit and a pooling data path, and the method further comprises:
   interpolating, by the interpolation unit, the feature map; and
   performing, by the pooling data path, a pooling operation on the interpolated feature map.

4. The method according to claim 3, further comprising:
   determining, by the pooling unit, a region of interest on the feature map.

5. The method according to claim 1, further comprising:
monitoring, by the sequencer, execution of a neural network task; and
parallelizing, by the sequencer, sub-tasks of the neural network task.

6. The method according to claim 1, wherein each core further comprises a direct memory access (DMA) unit, and the method further comprises:
transferring, by the DMA unit, data within each core and among the at least one core; and
inputting or outputting, by the DMA unit, data in parallel with computation of the convolution unit, the pooling unit, or the at least one operation unit.

7. The method according to claim 6, further comprising:
transforming, by the DMA unit, data between forms of an image and a matrix.

8. The method according to claim 1, further comprising:
performing, by the pooling unit, the pooling operation at least partly in parallel the convolution operation of the convolution unit.

9. The method according to claim 1, wherein each core further comprises a scalar unit and a scalar register file, and the method further comprises:
performing, by the scalar unit, a scalar operation; and
writing, by the scalar unit, a result of the scalar operation in the scalar register file.

10. A non-transitory computer-readable storage medium storing a set of instructions that is executable by at least one processing unit to cause the computer to perform a method, the processing unit comprising a command parser having circuitry configured to dispatch commands and computing tasks and at least one core communicatively coupled with the command parser and configured to process the dispatched computing task, each core comprising a convolution unit, a pooling unit, at least one operation unit and a sequencer communicatively coupled with the convolution unit, the pooling unit, and the at least one operation unit and having circuitry configured to distribute instructions of the dispatched computing task to the convolution unit, the pooling unit, and the at least one operation unit for execution, the sequencer further comprising circuitry configured to modify the instructions of the core; the method comprising:
reading, by the convolution unit, data from a local memory of the at least one operation unit;
performing, by the convolution unit, a convolution operation on the data to generate a feature map; and
performing, by the pooling unit, a pooling operation on the feature map.

11. The non-transitory computer-readable storage medium according to claim 10, wherein the at least one operation unit comprises: a matrix multiplication data path (DP) and an element-wise operation (EWOP) unit, and the set of instructions is executable by at least one processing unit to cause the computer to perform:
performing, by the matrix multiplication DP, a matrix multiplication operation on convolution data from the convolution unit to generate intermediate data; and
performing, by the EWOP unit, an EWOP to generate the feature map based on the intermediate data.

12. The non-transitory computer-readable storage medium according to claim 10, wherein the set of instructions is executable by at least one processing unit to cause the computer to perform:
monitoring, by the sequencer, execution of a neural network task; and
parallelizing, by the sequencer, sub-tasks of the neural network task.

13. The non-transitory computer-readable storage medium according to claim 10, wherein each core further comprises a direct memory access (DMA) unit, and the set of instructions is executable by at least one processing unit to cause the computer to perform:
transferring, by the DMA unit, data within each core and among the at least one core; and
inputting or outputting, by the DMA unit, data in parallel with computation of the convolution unit, the pooling unit, or the at least one operation unit.

14. The non-transitory computer-readable storage medium according to claim 10, wherein the set of instructions is executable by at least one processing unit to cause the computer to perform:
performing, by the pooling unit, the pooling operation at least partly in parallel the convolution operation of the convolution unit.

15. A processing unit, comprising:
a command parser having circuitry configured to dispatch commands and computing tasks; and
at least one core communicatively coupled with the command parser and configured to process the dispatched computing task, each core comprising:
a convolution unit having circuitry configured, by a convolution instruction, to perform a convolution operation to generate a feature map;
a pooling unit having circuitry configured, by a pooling instruction, to perform a pooling operation on the feature map;
at least one operation unit having circuitry configured to process data; and
a sequencer communicatively coupled with the convolution unit, the pooling unit, and the at least one operation unit, and having circuitry configured to distribute instructions of the dispatched computing task to the convolution unit, the pooling unit, and the at least one operation unit for execution; wherein the sequencer further comprises circuitry configured to modify the instructions of the core.

16. The processing unit according to claim 15, wherein the at least one operation unit comprises:
a local memory for storing data;
a matrix multiplication data path (DP) having circuitry configured, by a matrix multiplication instruction, to perform a matrix multiplication operation; and
an element-wise operation (EWOP) unit having circuitry configured, by a vector instruction, to perform an EWOP.

17. The processing unit according to claim 15, wherein the sequencer further has circuitry configured to monitor execution of a neural network task and to use a synchronization field of a branch instruction to coordinate sub-tasks of the neural network task in different cores.

18. The processing unit according to claim 15, wherein each core further comprises:
a direct memory access (DMA) unit having circuitry configured, by a local memory copy instruction, to transfer data within the core and having circuitry configured, by a copy instruction, to input or output data in parallel with computation of the convolution unit, the pooling unit, or the at least one operation unit.

19. The processing unit according to claim 15, wherein the pooling unit has circuitry configured, by a wait flag field of the pooling instruction, to perform the pooling operation at least partly in parallel the convolution operation of the convolution unit.

20. The processing unit according to claim 15, wherein the convolution instruction further comprises a modify flag field associated with in-line modification on fields of the convolution instruction for runtime binding and control.

\* \* \* \* \*